(12) United States Patent
Koh et al.

(10) Patent No.: US 9,317,331 B1
(45) Date of Patent: Apr. 19, 2016

(54) INTERACTIVE SCHEDULING OF AN APPLICATION ON A MULTI-CORE TARGET PROCESSOR FROM A CO-SIMULATION DESIGN ENVIRONMENT

(71) Applicant: The MathWorks, Inc., Natick, MA (US)

(72) Inventors: David Koh, Boston, MA (US); Murat Belge, Westford, MA (US)

(73) Assignee: The MathWorks, Inc., Natick, MA (US)

( * ) Notice: Subject to any disclaimer, the term of this patent is extended or adjusted under 35 U.S.C. 154(b) by 371 days.

(21) Appl. No.: 13/665,635

(22) Filed: Oct. 31, 2012

(51) Int. Cl.
*G06F 9/50* (2006.01)

(52) U.S. Cl.
CPC .................... *G06F 9/5027* (2013.01)

(58) Field of Classification Search
CPC G06F 9/5027; G06F 11/3664; G06F 11/3688
USPC ................................. 717/134, 135
See application file for complete search history.

(56) References Cited

U.S. PATENT DOCUMENTS

| | | | |
|---|---|---|---|
| 6,466,898 B1* | 10/2002 | Chan ................................. 703/17 |
| 7,370,156 B1* | 5/2008 | Nguyen et al. ................ 711/147 |
| 8,539,491 B1* | 9/2013 | Small et al. .................... 718/102 |
| 2007/0030280 A1* | 2/2007 | Paltashev et al. ............. 345/506 |
| 2011/0067029 A1* | 3/2011 | Wolfe et al. .................... 718/102 |
| 2012/0089970 A1* | 4/2012 | Cha et al. ....................... 717/150 |
| 2013/0212594 A1* | 8/2013 | Choi et al. ..................... 718/104 |

* cited by examiner

*Primary Examiner* — Anna Deng
(74) *Attorney, Agent, or Firm* — Nelson Mullins Riley & Scarborough LLP

(57) ABSTRACT

In an embodiment, a method for interactively varying scheduling of a multi-threaded application executing on a symmetric multi-core processor provides an interface in a co-simulation design environment. The interface is associated with a multi-threaded application executing on a target processor that includes symmetric processor cores. The method also sets a scheduling attribute of the multi-threaded application using the interface. The setting occurs when the multi-threaded application is executing. The method further receives data associated with the executing of the multi-threaded application in the co-simulation design environment when the multi-threaded application is executing subsequent to the setting of the scheduling attribute.

48 Claims, 28 Drawing Sheets

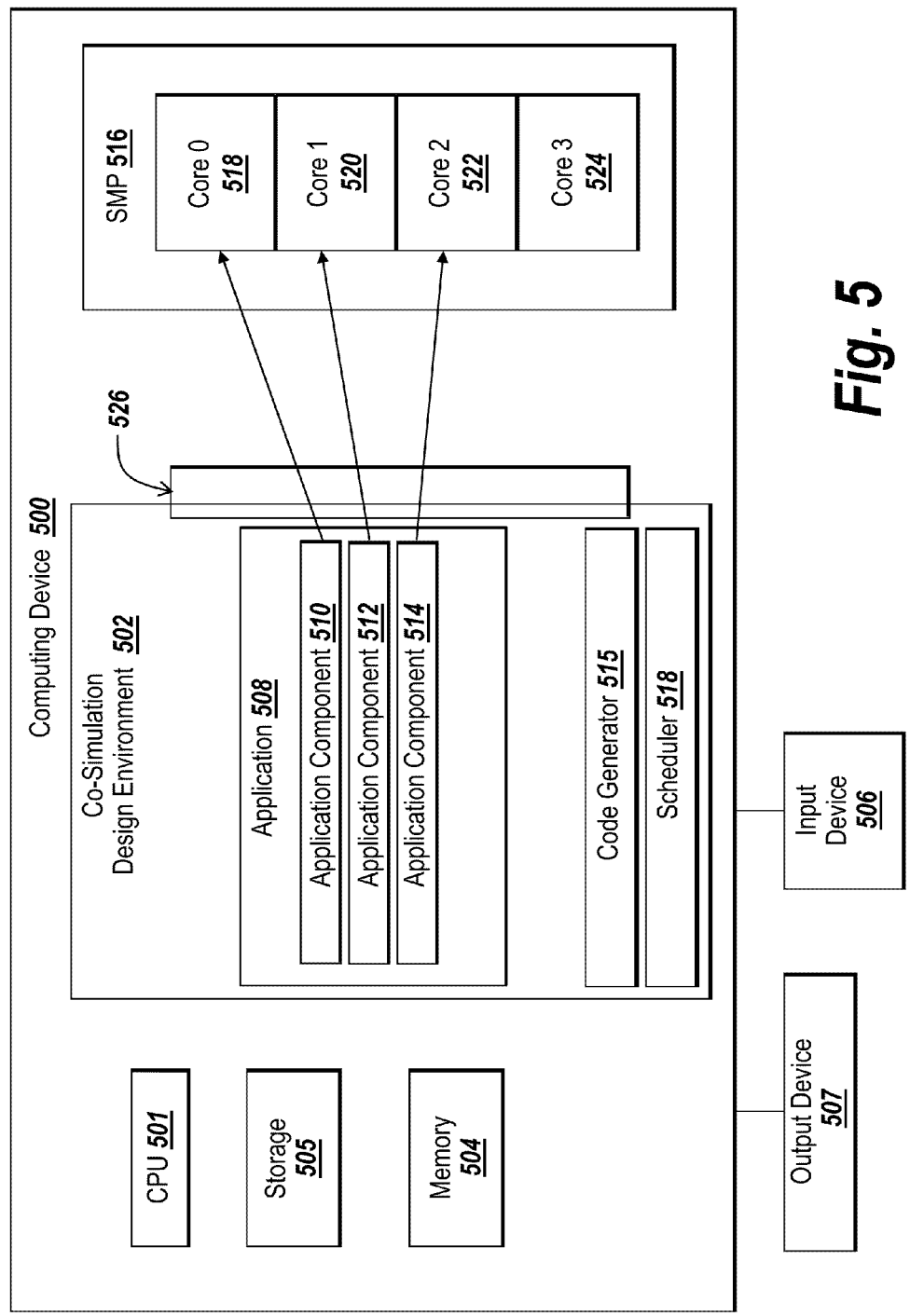

INTERACTIVE SCHEDULING OF AN APPLICATION ON A MULTI-CORE TARGET PROCESSOR FROM A CO-SIMULATION DESIGN ENVIRONMENT

BACKGROUND INFORMATION

Co-simulation is a technique used by developers to design, test, and optimize an application that is to be implemented on particular target hardware. With co-simulation, one or more components of an application in development executes on the target hardware. The target hardware may be a symmetric multi-core processor (SMP) where the resources associated with the cores are identical. That is, the execution characteristics of an application component running on one core of an SMP are identical to the execution characteristics of the same component running on any other core of the SMP.

During co-simulation, execution of the application under development may include one or more application components that are simulated in the host simulation environment and one or more application components that are executing on SMP. The one or more application components executing on the SMP may have been generated from the host environment via automatic code generation.

BRIEF DESCRIPTION OF THE DRAWINGS

The accompanying drawings, which are incorporated in and constitute a part of this specification, illustrate one or more embodiments of the invention and, together with the description, explain the invention. In the drawings:

FIG. 5 depicts an exemplary environment suitable for practicing exemplary embodiments;

DETAILED DESCRIPTION

According to various embodiments, an application is designed in a co-simulation design environment. The application may be designed by a user. A user may be a person, an algorithm, a program that is part of an application running in simulation, or any combination thereof. Accordingly, the term "interaction" may refer to an interaction with a person, an algorithm, a program or any combination thereof.

Exemplary co-simulation design environments may include graphical programming environments, e.g., block diagram environments (BDEs), and/or textual programming environments (TPEs). An application designed in a BDE may be a BDE model and an application designed in a TPE may be a TPE model. According to various embodiments, a TPE model can include one or more of a textual program, a script, a function, another TPE model, etc. A BDE model can include one or more of a block, a subsystem, another BDE model, etc.

The application designed in the co-simulation design environment may include one or more application components. As discussed in further detail below in connection with FIGS. 6A-6D, an application component may be formed by grouping together one or more elements of the application. An application component may be a subset of the application that is able to run independently from the rest of the application and that has defined boundaries along with a defined input and output.

In a TPE, the application components may be formed by grouping elements of the application by function, object, method, model, textual program, other demarcated boundary (e.g., a conditional statement), etc.

In a BDE, the components may be formed by grouping elements of the application by block, subsystem, rate, sub-model (e.g., Referenced Model), other demarcated boundary, etc. An application component may be composed of one or more execution threads that may be mapped to processing cores of a symmetric multi-core processor (SMP). An application component may be designated to execute on a SMP.

A scheduler may distribute, or map, execution threads of one or more application components to available processing cores at compile-time. Conventionally, the schedulers are implemented in the target processing device such as a SMP. Conventional schedulers may include conventional static schedulers and conventional dynamic schedulers.

Figure 1A:
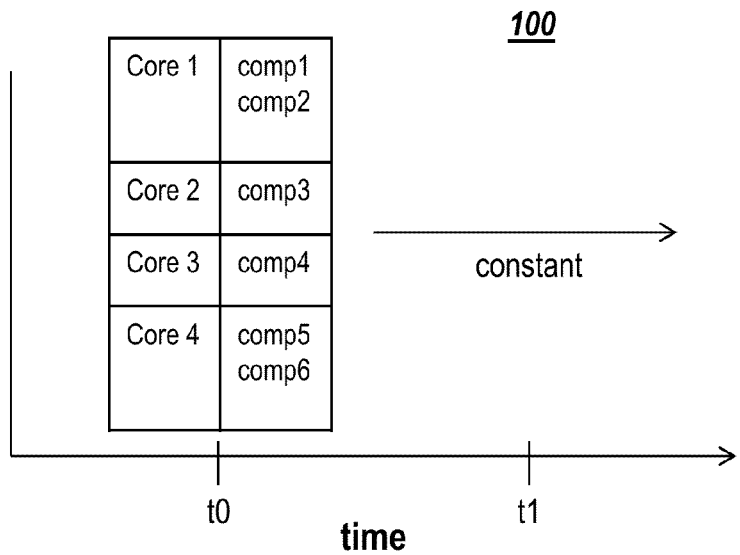
FIGS. 1A-1C depict exemplary conventional static schedulers.
Figure 1B:
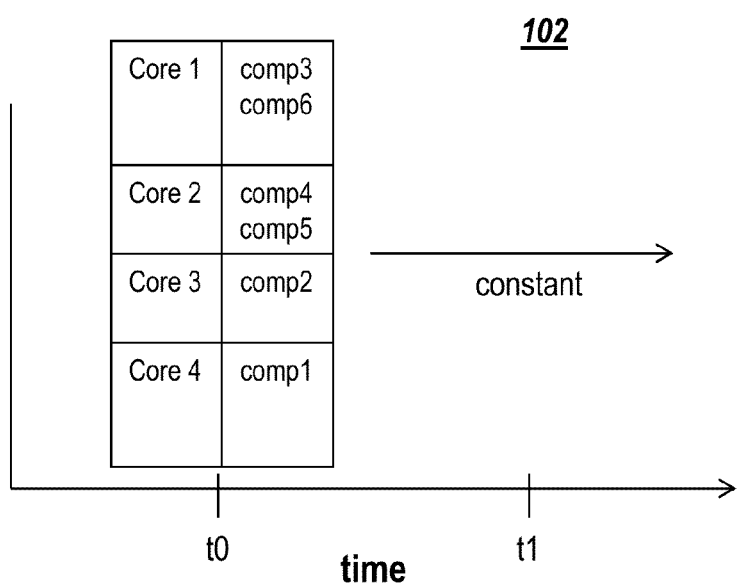
Figure 1C:
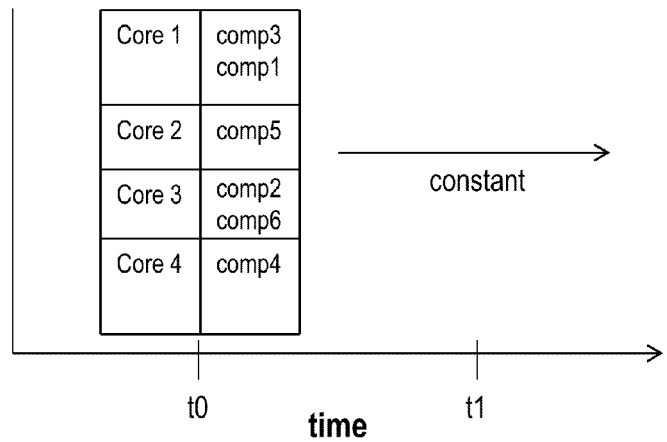

FIGS. 1A-1C illustrate conventional static schedulers 100, 102. A conventional static scheduler is a scheduler implemented on an SMP that implements a fixed mapping of execution threads of one or more application components to available processing cores of the SMP. The mapping created by conventional static scheduler 100, 102 does not change during execution (i.e., during runtime) of the application on the target SMP.

For example, conventional static scheduler 100 illustrated in FIG. 1A has the following fixed mapping: execution threads of application components 1 and 2 are mapped to processing core 1 of the SMP, execution threads of application component 3 are mapped to processing core 2 of the SMP, execution threads of application component 4 are mapped to processing core 3 of the SMP, and execution threads of application components 5 and 6 are mapped to processing core 4 of the SMP. The mapping between the execution threads of application components 1-6 and processing cores 1-4 implemented by conventional static scheduler 100 remains unchanged during the execution of the application components 1-6 on the SMP with processing cores 1-4.

Conventional static scheduler 102 illustrated in FIG. 1B implements a different fixed mapping. As shown in FIG. 1B, conventional static scheduler 102 maps execution threads of application components 3 and 6 to processing core 1 of the SMP, execution threads of application components 4 and 5 to processing core 2 of the SMP, execution threads of application component 2 to processing core 3 of the SMP, and execution threads of application component 1 to processing core 4 of the SMP. The mapping between the execution threads of application components 1-6 and processing cores 1-4 implemented by conventional static scheduler 102 remains unchanged during the execution of the application components 1-6 on the SMP with processing cores 1-4.

Conventional static scheduler 104 illustrated in FIG. 1C implements a different fixed mapping. As shown in FIG. 1C, conventional static scheduler 104 maps execution threads of application components 3 and 1 to processing core 1 of the SMP, execution threads of application component 5 to processing core 2 of the SMP, execution threads of application components 2 and 6 to processing core 3 of the SMP, and execution threads of application component 4 to processing core 4 of the SMP. The mapping between the execution threads of application components 1-6 and processing cores 1-4 implemented by conventional static scheduler 104 remains unchanged during the execution of the application components 1-6 on the SMP with processing cores 1-4.

Figure 2A:
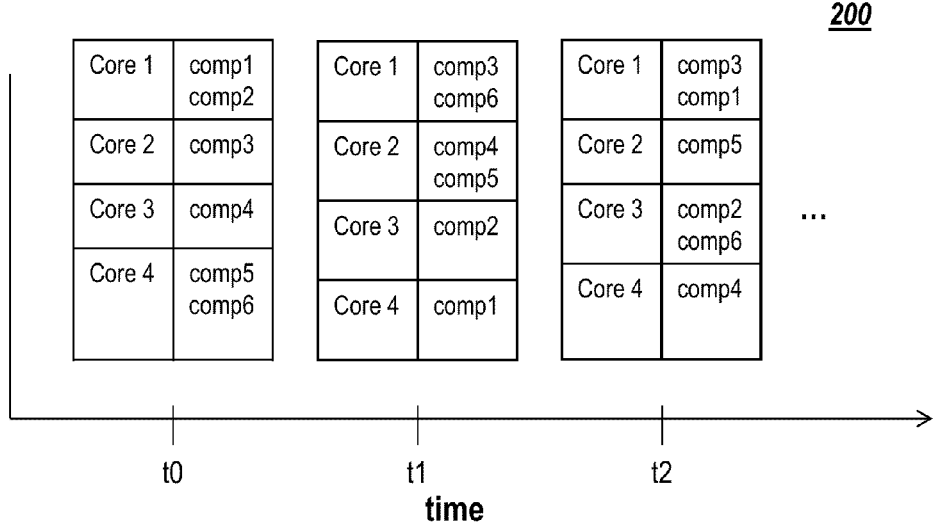
FIGS. 2A-2B depict exemplary conventional dynamic schedulers.
Figure 2B:
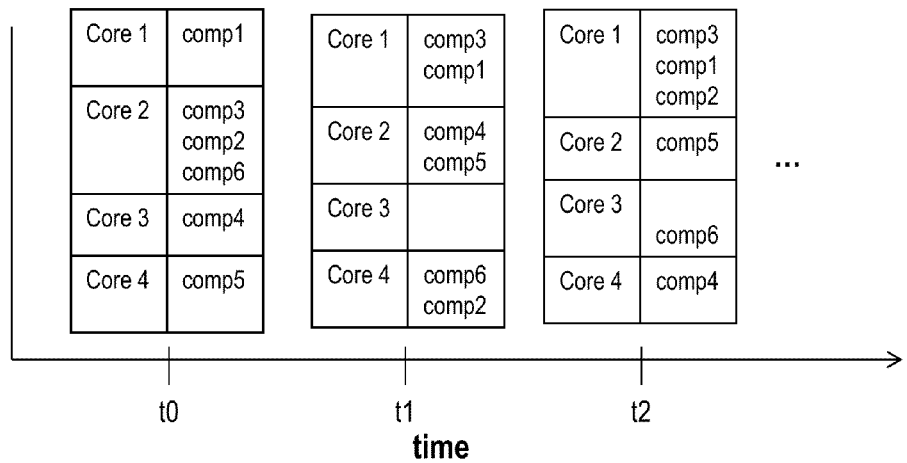

FIGS. 2A-2B illustrate conventional dynamic schedulers 200, 212. A conventional dynamic scheduler is a scheduler implemented on a SMP that implements dynamic mapping of execution threads of one or more application components to available processing cores of the SMP at runtime based on a scheduling policy. The scheduling policy may be based on a rule set associated with the dynamic state of the SMP during runtime and optionally the attributes of the execution threads to be processed. The conventional dynamic scheduler is typically implemented as an algorithm in the target SMP that dynamically maps execution threads to processing cores based on the instantaneous conditions of the runtime environment. For example, in a load-balancing dynamic scheduler, the thread to be executed may be mapped to a least busy processing core at that instance of time. The mapping of an execution thread to a specific processing core may be changed multiple times during the execution of the application.

Other exemplary conventional dynamic scheduling rule sets may include, for example, a shortest execution time scheme where the application component with the shortest predicted execution time is assigned to the least busy core and the application component with the second predicted execution time is assigned to the second least busy core, etc. One of ordinary skill in the art will appreciate that load-balancing and shortest execution time allocation execution rules are used for illustrative purposes only and that the execution criteria may include other execution rules and/or rule sets.

For example, conventional dynamic scheduler 200 illustrated in FIG. 2A may change the mapping of execution threads of application components 1-6 to processing cores 1-4 when application components are executing on the SMP. At time t=0, conventional dynamic scheduler 200 implements a first mapping where conventional dynamic scheduler 200 maps execution threads of the application components 1 and 2 to processing core 1 of the SMP, execution threads of the application component 3 to processing core 2 of the SMP, execution threads of the application component 4 to processing core 3 of the SMP, and execution threads of the application components 5 and 6 to processing core 4 of the SMP.

At time t=1, conventional dynamic scheduler 200 may change the mapping and implement a second mapping where: execution threads of the application components 3 and 6 are mapped to processing core 1 of the SMP, execution threads of the application components 4 and 5 are mapped to processing core 2 of the SMP, execution threads of the application component 2 are mapped to processing core 3 of the SMP, and execution threads of the application component 1 are mapped to processing core 4 of the SMP. While the execution of threads of the application components continues on the cores of the SMP, conventional dynamic scheduler 200 implements a third mapping at time t=3. As illustrated in FIG. 2A, at time t=2, execution threads of the application components 3 and 1 are mapped to processing core 1 of the SMP, execution threads of the application component 5 are mapped to processing core 2 of the SMP, execution threads of the application components 2 and 6 are mapped to processing core 3 of the SMP, and execution threads of the application component 4 are mapped to processing core 4 of the SMP.

FIG. 2B illustrates an exemplary dynamic mapping implemented by conventional dynamic scheduler 212. Conventional dynamic scheduler 212 illustrated in FIG. 2B may change the mapping of execution threads of the application components 1-6 to processing cores 1-4 during the execution of the application components on the SMP. At time t=0, conventional dynamic scheduler 212 may implement a first mapping where execution threads of the application component 1 are mapped to processing core 1 of the SMP, execution threads of the application components 2, 3 and 6 are mapped to processing core 2 of the SMP, execution threads of the application component 4 are mapped to processing core 3 of the SMP, and execution threads of the application component 5 are mapped to processing core 4 of the SMP.

At time t=1, conventional dynamic scheduler 212 may change the mapping and implements a second mapping: execution threads of the application components 1 and 3 are mapped to processing core 1 of the SMP, execution threads of the application components 4 and 5 are mapped to processing core 2 of the SMP, no execution thread is mapped to processing core 3 of the SMP, and execution threads of the application components 2 and 6 are mapped to processing core 4 of the SMP. Thus, conventional dynamic scheduler 212 does not have to assign execution thread of the application components to each processing core of the SMP.

Conventional dynamic scheduler 212 may choose to assign no execution thread or all execution threads to a given processing core of the SMP. While the execution of the components continues on the processing cores of the SMP, conventional dynamic scheduler 212 may implement a third mapping at time t=2. As illustrated in FIG. 2B, at time t=3, execution threads of the application components 1, 2 and 3 are mapped to processing core 1 of the SMP, execution threads of the application component 5 are mapped to processing core 2 of the SMP, execution threads of the application component 6 are mapped to processing core 3 of the SMP, and execution threads of the application component 4 are mapped to processing core 4 of the SMP. As shown in FIGS. 2A-2B a conventional dynamic scheduler may change the mapping of an execution thread of an application component to a specific processing core multiple times during the execution of the application.

According to various embodiments, conventional schedulers may be implemented in the co-simulation design environment. Such schedulers are referred as co-simulation schedulers. For example, if a conventional static scheduler is implemented in the co-simulation design environment, such scheduler is referred as a co-simulation static scheduler. Accordingly, the co-simulation static scheduler is a scheduler implemented in the co-simulation environment with a fixed mapping of execution threads to processing cores. The mapping implemented by a co-simulation static scheduler is similar to the mapping illustrated in FIGS. 1A-1C. However, contrary to a conventional static scheduler which is implemented on the target processor such as the SMP, the co-simulation static scheduler is implemented in the co-simulation design environment.

If a conventional dynamic scheduler is implemented in the co-simulation design environment, such scheduler is referred as a co-simulation dynamic scheduler. Accordingly, the co-simulation dynamic scheduler is a scheduler implemented in the co-simulation environment with a dynamic mapping of execution threads to processing cores. The mapping implemented by a co-simulation dynamic scheduler is similar to the mapping illustrated in FIGS. 2A-2B. However, contrary to a conventional dynamic scheduler which is implemented on the target processor such as the SMP, the co-simulation dynamic scheduler is implemented in the co-simulation design environment.

According to various embodiments, interactive schedulers may be constructed from co-simulation schedulers. For example, an interactive static scheduler may be constructed from a co-simulation static scheduler. The interactive static scheduler is a scheduler implemented in the co-simulation environment that may interactively change from one co-simulation static scheduler to another co-simulation static scheduler during co-simulation, without re-generating, re-compiling or re-running code for the one or more application components.

The interactive static scheduler remaps execution threads of application components to processing cores during co-simulation, i.e. at runtime, from the co-simulation environment. This form of operation by an interactive static scheduler is referred to as "changing of co-simulation static schedulers." The varying of one co-simulation static scheduler to another co-simulation static scheduler is prompted by the user. As provided above, the user may be a person, an algorithm, a program that is part of an application running in simulation, or any combination thereof. Varying one co-simulation static scheduler to another co-simulation static scheduler has the effect of changing the mapping of execution threads of application components to processing cores without re-generating, re-compiling or re-running code for the one or more application components.

Figure 3:
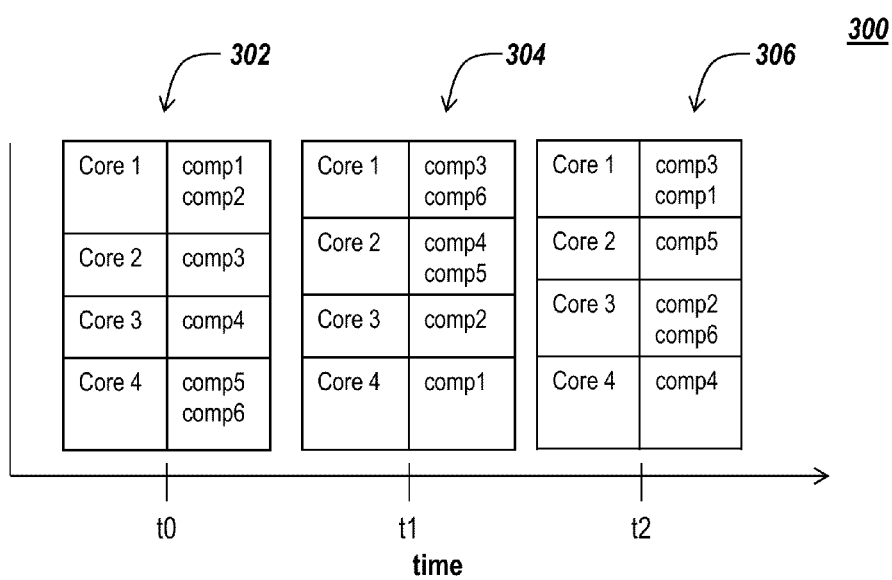
FIG. 3 depicts an exemplary interactive static scheduler.

FIG. 3 illustrates an exemplary interactive static scheduler 300. As illustrated in FIG. 3, interactive static scheduler 300 implemented in the co-simulation environment may interactively change from one co-simulation static scheduler 302 at time t=0 to another co-simulation static scheduler 304 at time t=1 and then to another co-simulation static scheduler 306 at time t=2 during co-simulation, without re-generating, re-compiling or re-running code for the one or more application components.

At time t=0, interactive static scheduler 300 implements a first co-simulation static scheduler 302 where execution threads of the application components 1 and 2 are mapped to processing core 1 of the SMP, execution threads of the application component 3 are mapped to processing core 2 of the SMP, execution threads of the application component 4 are mapped to processing core 3 of the SMP, and execution threads of the application components 5 and 6 are mapped to processing core 4 of the SMP.

At time t=1, interactive static scheduler 300 may change to co-simulation static scheduler 304 without re-generating, re-compiling or re-running code for the one or more application components. As illustrated in FIG. 3, at time t=1, execution threads of the application components 3 and 6 are mapped to processing core 1 of the SMP, execution threads of the application components 4 and 5 are mapped to processing core 2 of the SMP, execution threads of the application component 2 are mapped to processing core 3 of the SMP, and execution threads of the application component 1 are mapped to processing core 4 of the SMP.

At time t=2, interactive static scheduler 300 may change to co-simulation static scheduler 306 without re-generating, re-compiling or re-running code for the one or more application components. As illustrated in FIG. 3, at time t=2, execution threads of the application components 3 and 1 are mapped to processing core 1 of the SMP, execution threads of the application component 5 are mapped to processing core 2 of the SMP, execution threads of the application components 2 and 6 are mapped to processing core 3 of the SMP, and execution threads of the application component 4 are mapped to processing core 4 of the SMP.

The technique of changing the mapping of execution threads to processing cores at runtime, such as changing from co-simulation static scheduler 302 to co-simulation static scheduler 304, may be thought of as "changing of co-simulation static schedulers" during co-simulation (i.e., run-time), without re-generating, re-compiling or re-running code for the one or more application components. In certain embodiments, a desired co-simulation static scheduler may be chosen during co-simulation. Based on the selected co-simulation static scheduler, a desired conventional static scheduler that will implement a static mapping of threads to cores at compile time of the application may be automatically generated. This generated conventional static scheduler may be reused for subsequent executions of the application on target SMP.

According to various embodiments, interactive dynamic schedulers may be constructed from co-simulation schedulers. For example, an interactive dynamic scheduler may be constructed from a co-simulation dynamic scheduler. The interactive dynamic scheduler is a scheduler implemented in the co-simulation environment that may interactively change from one co-simulation dynamic scheduler to another co-simulation dynamic scheduler during co-simulation, without re-generating, re-compiling or re-running code for the one or more application components.

The interactive dynamic scheduler remaps execution threads of application components to processing cores during co-simulation, i.e. at runtime, from the co-simulation environment. Accordingly, the interactive dynamic scheduler is a scheduler implemented in the co-simulation environment that may vary from one co-simulation dynamic scheduler to another co-simulation dynamic scheduler at runtime during co-simulation, without re-generating, re-compiling or re-running code for the one or more application components. This form of operation by an interactive dynamic scheduler is referred to as "changing of co-simulation dynamic schedulers." The varying of one co-simulation dynamic scheduler to another co-simulation dynamic scheduler may be prompted by the user. As provided above, the user may be a person, an algorithm, a program that is part of an application running in simulation, or any combination thereof.

A co-simulation dynamic scheduler remaps execution threads of application components to processing cores based on, for example, conditions and/or rule sets of the runtime environment during co-simulation without re-generating, re-compiling or re-running code for the one or more application components. For example, an interactive dynamic scheduler may change a co-simulation dynamic scheduler based on load-balancing, where the execution thread of an application component is mapped to a least busy processing core at that instance of time, to another co-simulation dynamic scheduler where the execution threads of the application component are mapped to the processing core that has been running the longest. One of ordinary skill in the art will appreciate that other conditions and/or rule sets, such as dependency among threads (e.g., requiring two or more execution threads to run on the same processing core, etc.), can be used to determining how co-simulation dynamic schedulers may map execution threads to processing cores. In certain embodiments, a desired co-simulation dynamic scheduler may be chosen during co-simulation. Based on the chosen co-simulation dynamic scheduler, a desired conventional dynamic scheduler may be automatically generated using an embodiment of the invention. The generated conventional dynamic scheduler may be reused for subsequent executions of the application on target SMP.

Figure 4:
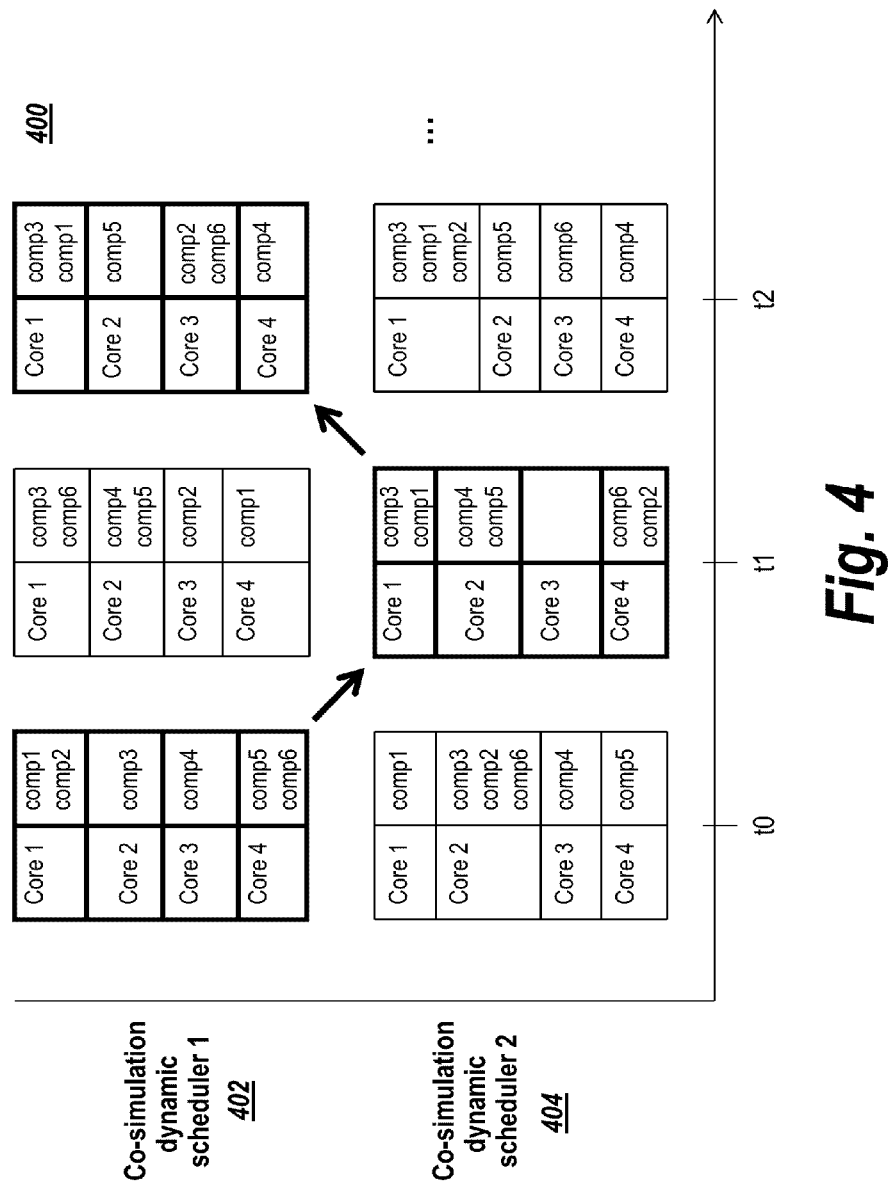
FIG. 4 depicts an exemplary interactive dynamic scheduler.

FIG. 4 illustrates an exemplary interactive dynamic scheduler 400. As illustrated in FIG. 4, interactive dynamic scheduler 400 implemented in the co-simulation environment may interactively change from one co-simulation dynamic scheduler 402 to another co-simulation dynamic scheduler 404 during co-simulation, without re-generating, re-compiling or re-running code for the one or more application components. Changing from one co-simulation dynamic scheduler to another co-simulation dynamic scheduler has the effect of changing the mapping of execution threads of application components to processing cores without re-generating, re-compiling or re-running code for the one or more application components.

At time t=0, interactive dynamic scheduler 400 implements the first mapping of co-simulation dynamic scheduler 402 where execution threads of the application components 1 and 2 are mapped to processing core 1 of the SMP, execution threads of the application component 3 are mapped to processing core 2 of the SMP, execution threads of the application component 4 are mapped to processing core 3 of the SMP, and execution threads of the application components 5 and 6 are mapped to processing core 4 of the SMP.

At time t=1, interactive dynamic scheduler 400 may change to co-simulation dynamic scheduler 404 without re-generating, re-compiling or re-running code for the one or more application components. Interactive dynamic scheduler 400 may implement the second mapping of co-simulation dynamic scheduler 404 where: execution threads of the application components 3 and 1 are mapped to processing core 1 of the SMP, execution threads of the application components 4 and 5 are mapped to processing core 2 of the SMP, execution threads of the application components 6 and 2 are mapped to processing core 4 of the SMP.

At time t=2, interactive dynamic scheduler 400 may change back to co-simulation dynamic scheduler 402 without re-generating, re-compiling or re-running code for the one or more application components. Interactive dynamic scheduler 400 may implement the third mapping of co-simulation dynamic scheduler 402 where: execution threads of the application components 3 and 1 are mapped to processing core 1 of the SMP, execution threads of the application component 5 are mapped to processing core 2 of the SMP, execution threads of the application components 2 and 6 are mapped to processing core 3 of the SMP and execution threads of the application component 4 are mapped to processing core 4 of the SMP.

Changes to a mapping of execution threads to processing cores at runtime, such as changing from co-simulation dynamic scheduler 402 to co-simulation dynamic scheduler 404, is a technique of "changing co-simulation dynamic schedulers" during co-simulation (i.e., run-time) without re-generating, re-compiling or re-running code for the one or more application components. In certain embodiments, a desired co-simulation dynamic scheduler may be chosen during co-simulation. Based on the selected co-simulation dynamic scheduler, a desired conventional dynamic scheduler that will implement a dynamic mapping of threads to cores at compile time of the application may be automatically generated. This generated conventional dynamic scheduler may be reused for subsequent executions of the application on target SMP.

A co-simulation dynamic scheduler remaps execution threads of application components to processing cores during co-simulation, i.e. at runtime, from the co-simulation environment. The varying of one mapping of execution threads of application components to processing cores to another mapping of execution threads of application components to processing cores is performed by the co-simulation dynamic scheduler. A co-simulation dynamic scheduler changes the mapping of execution threads of application components to processing cores without re-generating, re-compiling or re-running code for the one or more application components A co-simulation dynamic scheduler may operate in a similar manner as an interactive static scheduler. As example, the co-simulation dynamic scheduler 402 of FIG. 4 may operate in a similar manner as the interactive static scheduler 300 of FIG. 3. According to various embodiments, an interactive static scheduler may help to generate an optimal conventional static scheduler. For example, the interactive static scheduler 300 of FIG. 3 may be used to generate an optimal conventional static scheduler, such as the conventional static scheduler 100, 102 or 104 illustrated in FIGS. 1A-1C, respectively. In some embodiments, a co-simulation dynamic scheduler may help to generate a conventional dynamic scheduler. For example, the co-simulation dynamic scheduler 402 or 404 of FIG. 4 may be used to generate a conventional dynamic scheduler, such as the conventional dynamic scheduler 200 or 212 illustrated in FIGS. 2A-2B, respectively. In some embodiments, a co-simulation dynamic scheduler may be used to construct an interactive dynamic scheduler, which may be used to generate an optimal conventional dynamic scheduler. For example, the co-simulation dynamic scheduler 400 and/or 402 of FIG. 4 may be used to construct an interactive dynamic scheduler, such as the interactive dynamic scheduler 400 illustrated in FIG. 4. The interactive dynamic scheduler 400 may be used to generate an optimal conventional dynamic scheduler, such as the conventional dynamic scheduler 200 or 212 illustrated in FIGS. 2A-2B, respectively.

The interactive static and dynamic schedulers discussed above may allow interactive re-scheduling of execution threads of the application components to different processing cores of the target SMP during execution of the one or more application components, (i.e., without stopping execution of the one or more application components). The re-scheduling during co-simulation does not alter the design of the one or more application components and does not require re-generating, re-compiling or re-running code for the one or more application components. Accordingly, the re-scheduling discussed herein represents improved efficiency and time savings compared to conventional approaches that require re-generating, re-compiling, and re-running of code for the components in order to find a suitable conventional static and/or dynamic scheduler.

The ability to assess various scheduling schemes by interactively altering co-simulation static or dynamic schedulers may help to determine an optimal co-simulation scheduling scheme without re-generating, re-compiling or re-running code for the application. Conventional scheduling schemes assess a single candidate conventional scheduler. If a different scheduling scheme is to be employed, the conventional schemes need to stop the target SMP, re-generate, re-compile, and re-run code for the application using the different scheduling scheme. According to various embodiments discussed herein, a desired co-simulation static or dynamic scheduler may be identified during co-simulation using interactive scheduling. The desired conventional static or dynamic scheduler (that corresponds to the identified co-simulation static or dynamic scheduler) may then be generated for standalone deployment of the application on the target SMP. Contrary to the conventional scheduling schemes, embodiments allow interactively altering co-simulation static or dynamic schedulers to generate the desired conventional static or dynamic scheduler without re-generating, re-compiling or re-running code for the application.

Embodiments allow profiling results, i.e. runtime statistics, of various static and dynamic scheduling schemes that map the execution threads of application components to specific processing cores on the target SMP to be considered and acted upon. For example, relevant runtime statistics, such as CPU load and memory usage, may be streamed back to the co-simulation design environment from the target SMP in real time, i.e. while the code for the application components is being executed on the target SMP. According to various embodiments, the target SMP may send continuous runtime statistics updates to the co-simulation design environment. A portion of the runtime statistics may be provided to the user in various graphical and/or textual formats, if desired. Based on the profiling results, the user may change the co-simulation static or dynamic scheduling scheme to improve execution efficiency of the code including but not limited to increasing execution speed, minimizing memory usage, improving load distribution across cores, minimizing power consumption, minimizing communication among the cores, etc. For example, the user may change the mapping for faster execution or to better meet application design constraints.

According to exemplary embodiments, runtime scheduling experiments may be conducted in the co-simulation design environment to determine and subsequently generate schedulers that satisfy (e.g., meet or exceed) a design requirement for an application. A generated scheduler may identify a scheduling scheme for executing the application being designed in the co-simulation design environment on the SMP. The generated scheduler may be reused in subsequent executions of the application on the SMP.

FIG. 5 depicts an exemplary computing system that may be used to practice an embodiment of the invention. The exemplary computing system may include a computing device 500 equipped with a processor. Computing device 500 is intended to be illustrative and not limiting of the present invention. Computing device 500 may take many forms, including but not limited to a personal computer, workstation, server, network computer, quantum computer, optical computer, Internet appliance, mobile device, a pager, a tablet computer, and the like. Computing device 500 may be electronic and may include Central Processing Unit (CPU) 501 for executing computer-executable instructions, memory, storage, modem, network interface, etc. CPU 501 may control components of computing device 500 to provide co-simulation design environment 502 discussed below in greater detail. Memory 504 temporarily stores instructions and data and provides them to CPU 501 so that CPU 501 operates the computing device 500.

Optionally, computing device 500 may include multiple CPUs for executing software loaded in memory 504, and other programs for controlling system hardware. Each of the CPUs can be a single or a multiple core processor. The code loaded in memory 504 may run in a virtualized environment, such as in a Virtual Machine (VM). Multiple VMs may be resident on a single processor. Also, part of the code may be run in hardware, for example, by configuring a field programmable gate array (FPGA), using an application specific instruction set processor (ASIP) or creating an application specific integrated circuit (ASIC). Further, part of the applications may be run on analog electronic devices or other resources, may be used to run part of the application, such as graphics processing units (GPUs), or may be dedicated hardware such as Fast Fourier Transform (FFT) processing blocks.

Storage 505 may contain software tools for applications. Storage can include code for the operating system (OS) of the computing device 500, code for at least one application executed by the OS including the applications for the co-simulation design environment 502. Storage may also hold data generated from the co-simulation design environment 502. Those of ordinary skill in the art will appreciate that parts of applications can be stored in the CPU cache or memory as well, or they can be stored on a network.

Input device 506 coupled to computing device 500 may include a keyboard, mouse, microphone, camera, such as a web camera, or other input device such as a 3D mouse, space mouse, multipoint touchpad, accelerometer-based device, gyroscope-based device, etc. Computing device 500 may receive, through input device 506, input data, such as the input data for developing a model. Computing device 500 may display on output device 507 one or more interfaces for displaying the data generated from co-simulation design environment 502.

As discussed above, computing device 500 may host co-simulation design environment 502. For example, computing device 500 may host a BDE or TPE. The co-simulation design environment 502 may be used to create and test application 508. Application 508 may include one or more of a block diagram, a state-based diagram, a textual program, a technical computing program that performs technical calculations when executed, etc.

For example, co-simulation design environment 502 may be used to develop a block diagram application or a textual application. Application 508 may have one or more application components, such as application components 510, 512 and 514. Furthermore, co-simulation design environment 502 may include code generator 515. Code generator 515 may be used to generate code that executes on an SMP 516. For example, code generator 515 may generate code for application components 510, 512 and 514 where the generated code is capable of executing on SMP 516. Code generator 515 may be implemented in hardware or a combination of hardware and software.

A scheduler 518 for application 508 may be developed in co-simulation design environment 502. Scheduler 518 may be an interactive static scheduler or an interactive dynamic scheduler. Scheduler 518 may implement a mapping of application components 510, 512 and 514 to individual processing cores on SMP 516. SMP 516 may include identical processing cores: core 518, core 520, core 522 and core 524. The term "identical" is used herein to indicate that resources associated with the cores are identical. That is, when the input to cores 518, 520, 522, 524 is the same, execution results of a given core of SMP 516 are identical to the execution results of any other core of SMP 516. It will be appreciated that the number of cores depicted in SMP 516 is exemplary and the actual number of identical cores in SMPs utilized by embodiments may be less or greater. In one embodiment, SMP 516 may be the processor for computing device 500.

Based on the mapping, code for application components 510, 512 and 514 may be executed on the assigned cores 518, 520, 522 and 524 during a co-simulation of application 508. For example, application component 510 may be mapped to execute on core 518. Application component 512 may be mapped to execute on core 520. Application component 514 may be mapped to execute on core 522. The mapping may maintain data synchronization within application 508, and across application components 510, 512 and 514. That is, if application 508 includes multiple copies of a dataset, application 508 may be mapped to execute such that the multiple copies are kept in coherence with one and other, and therefore data integrity is maintained. Thread synchronization primitives may be implemented to maintain data synchronization.

It will be appreciated that application 508 can contain at least one application component that is simulated in co-simulation design environment 502 while other application components from application 508 are executed on SMP 516.

During a co-simulation of application 508, profiling results may be generated during execution of application 508 and provided to co-simulation design environment 502 from the SMP 516 in real-time, i.e., while application 508 is executing. Profiling results may include performance statistics associated with the cores of the target SMP. For example, profiling results may include, but are not limited to, metrics and/or runtime statistics associated with the execution of application 508 on SMP 516. Exemplary profiling results may include processor load (a metric associated with the execution utilization of a core), memory usage, stack usage, cache utilization (e.g., hit/miss statistics), etc. Profiling results may also include metrics relating to a buffer allocation, algorithm data synchronization, an inter-thread wait time, resource utilization by other applications and the execution priorities of those applications. Profiling results are discussed below in greater detail in connection with FIGS. 8A-12C.

A user of co-simulation design environment 502 (e.g. a person, another software program or an algorithm that is part of the application running in simulation, etc.) may view profiling results via interface 526. According to various embodiments, interface 526 may include a graphical user interface (GUI) or an application programming interface (API). In an embodiment, interface 526 may be provided via output device 507 in communication with computing device 500. The user may review the information from profiling results. Based on the review, the user may interactively vary the scheduling scheme of scheduler 518 during the execution of application 508 via interface 526. According to various embodiments, the user may use input device 506 to interact with interface 526. The scheduling scheme may be interactively varied without halting execution of application 508. In addition, the scheduling scheme can be modified without re-generating, re-compiling or re-running code for application 508.

According to various embodiments, the application components may be formed by grouping, i.e. factoring together, various components of application 508. FIGS. 6A-6D depict an exemplary technique for factoring an application into application components within a BDE.

Figure 6A:
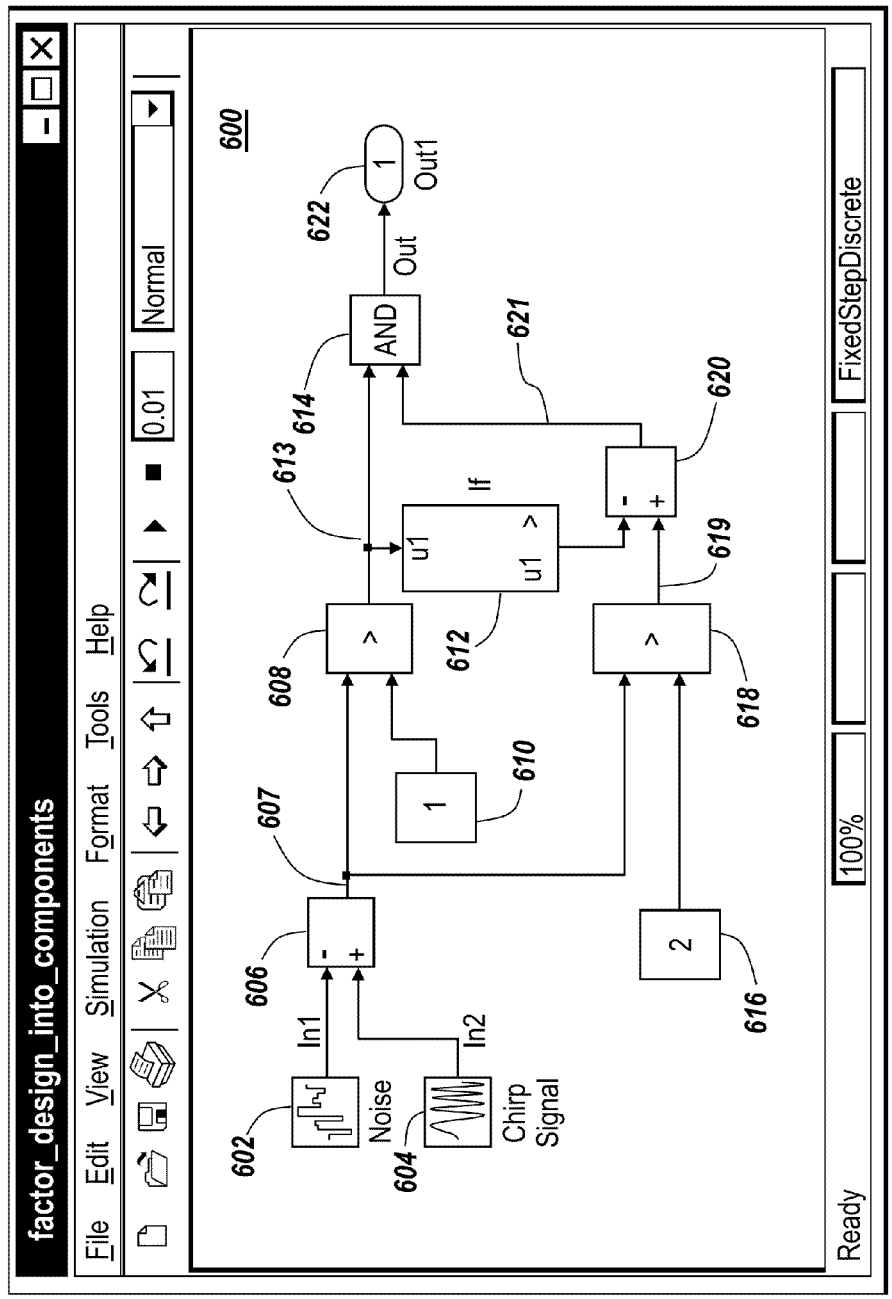
FIG. 6A depicts an exemplary application, e.g. an exemplary block diagram environment (BDE) model.

FIG. 6A includes a block diagram model 600. Block diagram model 600 includes noise input 602, chirp signal input 604 and constant input 616. Noise input 602 and chirp signal input 604 are fed into adder block 606 where the sum of noise input 602 and chirp signal input 604 is calculated. The sum is output from block 606 as output signal 607. Output signal 607 is compared to a first constant signal 610 at block 608. Block 608 outputs the larger of output signal 607 and first constant signal 610 as output 613. Output signal 607 is also compared to a second constant signal 616 at block 618. Block 618 outputs the larger of output signal 607 and second constant signal 616 as output 619.

Output signal 613 is fed into if-block 612. If output signal 613 satisfies the condition specified in the if-block 612, output signal 613 is added with output signal 619 at adder block 620. The output 621 of adder block 620 is fed into block 614 which may contain a Boolean expression such as 'AND'. Output signal 613 is also fed into block 614. The output of block 614 may be generated as the final output 622 of the block diagram model 600 illustrated in FIG. 6A. Block diagram model 600 may be an executable block diagram model that represents a dynamic system that can be simulated on target hardware. Additionally, block diagram 600 may be factored according to an instruction received from a user or programmatically, e.g., from a remote application. The factorization of block diagram 600 is illustrated in FIGS. 6B-6C.

Figure 6B:
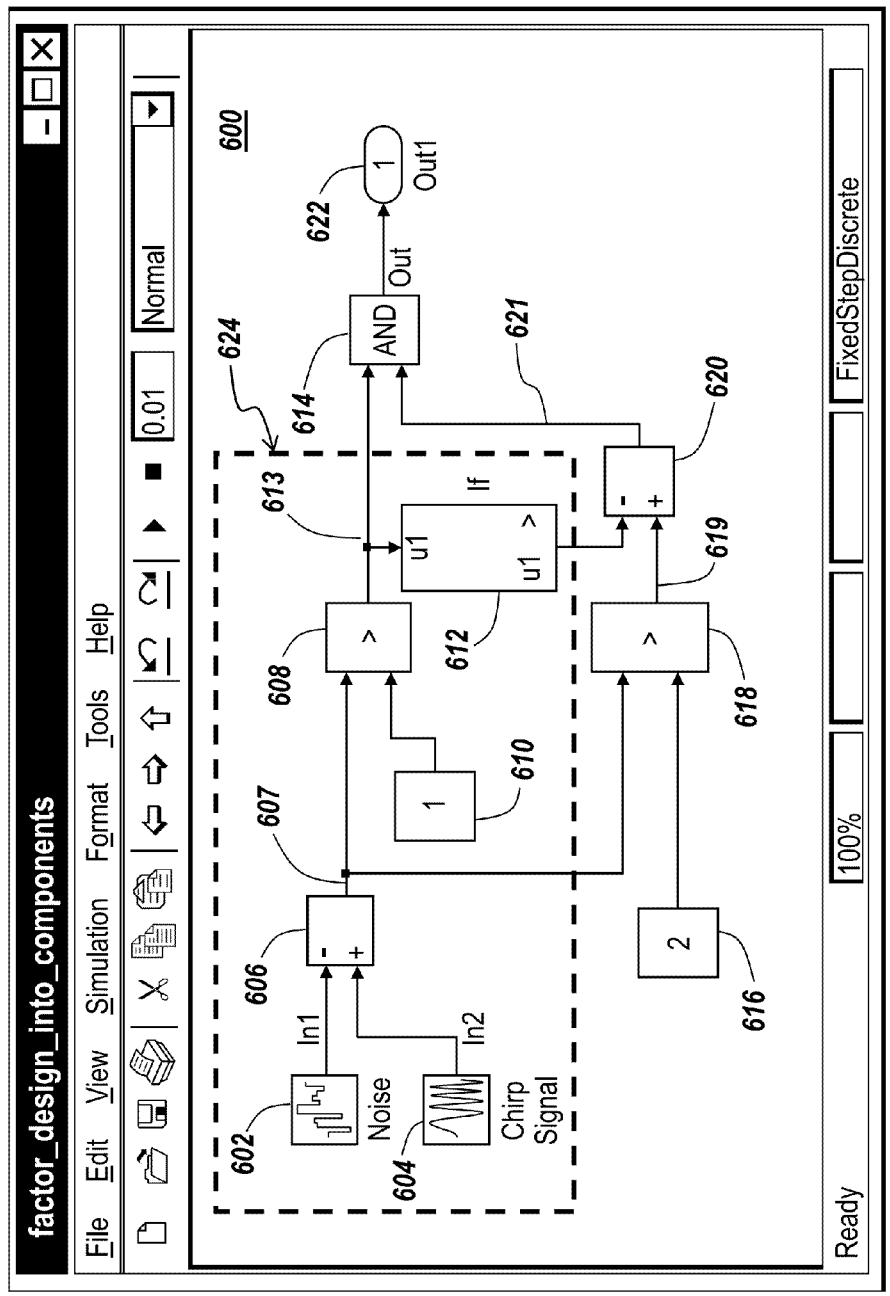
FIGS. 6B-6C depict elements of the exemplary BDE model illustrated in FIG. 6A being factored into application components.

As illustrated in FIG. 6B, blocks 602, 604, 606, 608, 610, and 612 may be grouped together to form a first factored region, e.g. demarcation boundary 624, of diagram 600 according to an instruction received from a user or programmatically, e.g., from a remote application. Demarcation boundary 624 indicates that blocks 602, 604, 606, 608, 610 and 612 represent a group. Blocks 614, 616, 618, 620 and 622 of block diagram 600 remain outside demarcation boundary 624 and thus are not part of the group. Grouping of the elements illustrated in FIG. 6B is for illustrative purposes and should not be construed as limiting.

Figure 6C:
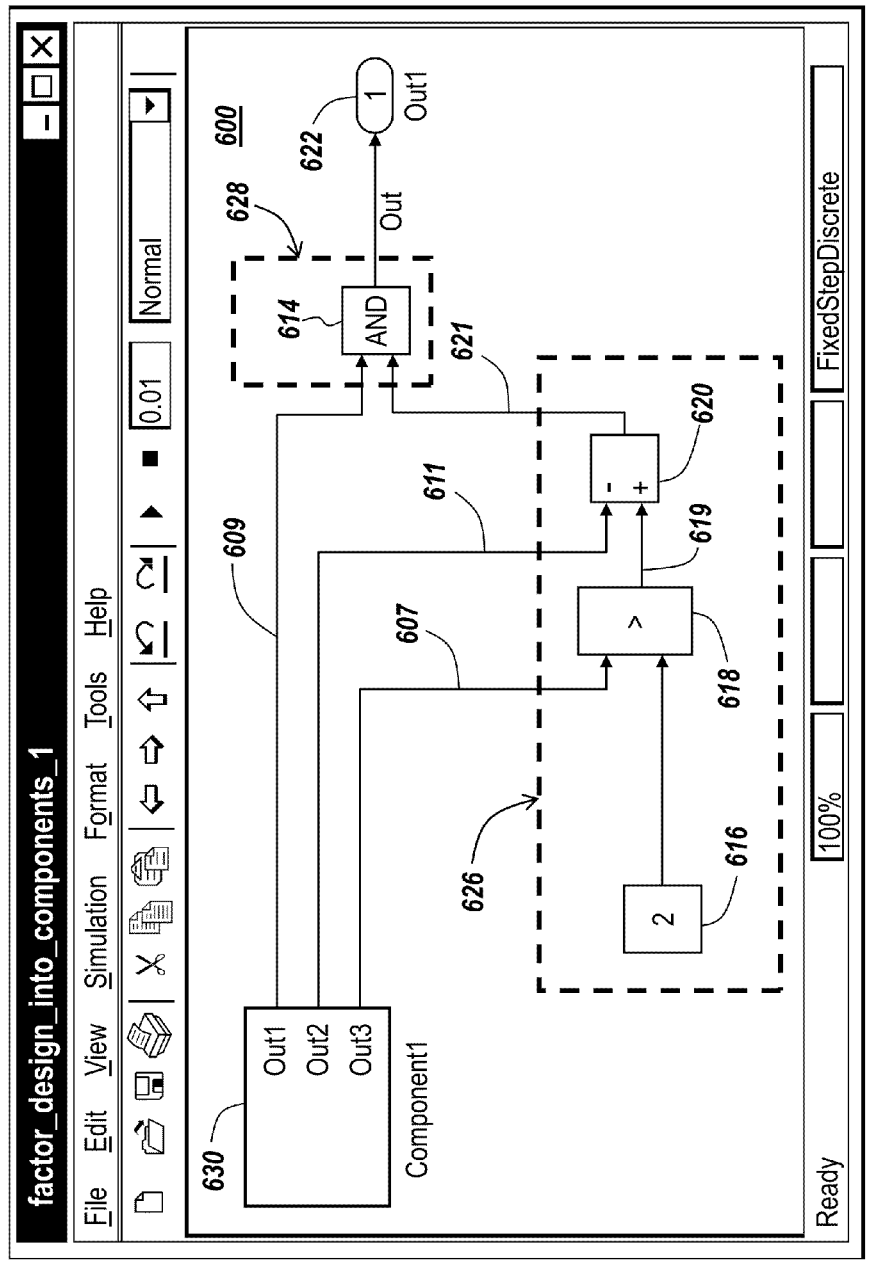

In FIG. 6C, the blocks within demarcation boundary 624 are designated as application component 630 in block diagram 600. Use of application component 630 to represent blocks 602, 604, 606, 608, 610, and 612 does not alter the design of block diagram 600. As illustrated in FIG. 6B, three outputs 607, 609 and 611 leave the demarcated boundary of application component 630. These three outputs 607, 609, 611 are illustrated as output signals of application component 630 in FIG. 2C. FIG. 6C further illustrates an additional grouping of blocks 616, 618 and 620 using demarcation boundary 626. Similarly, block 614 is encompassed by demarcation boundary 628.

Figure 6D:
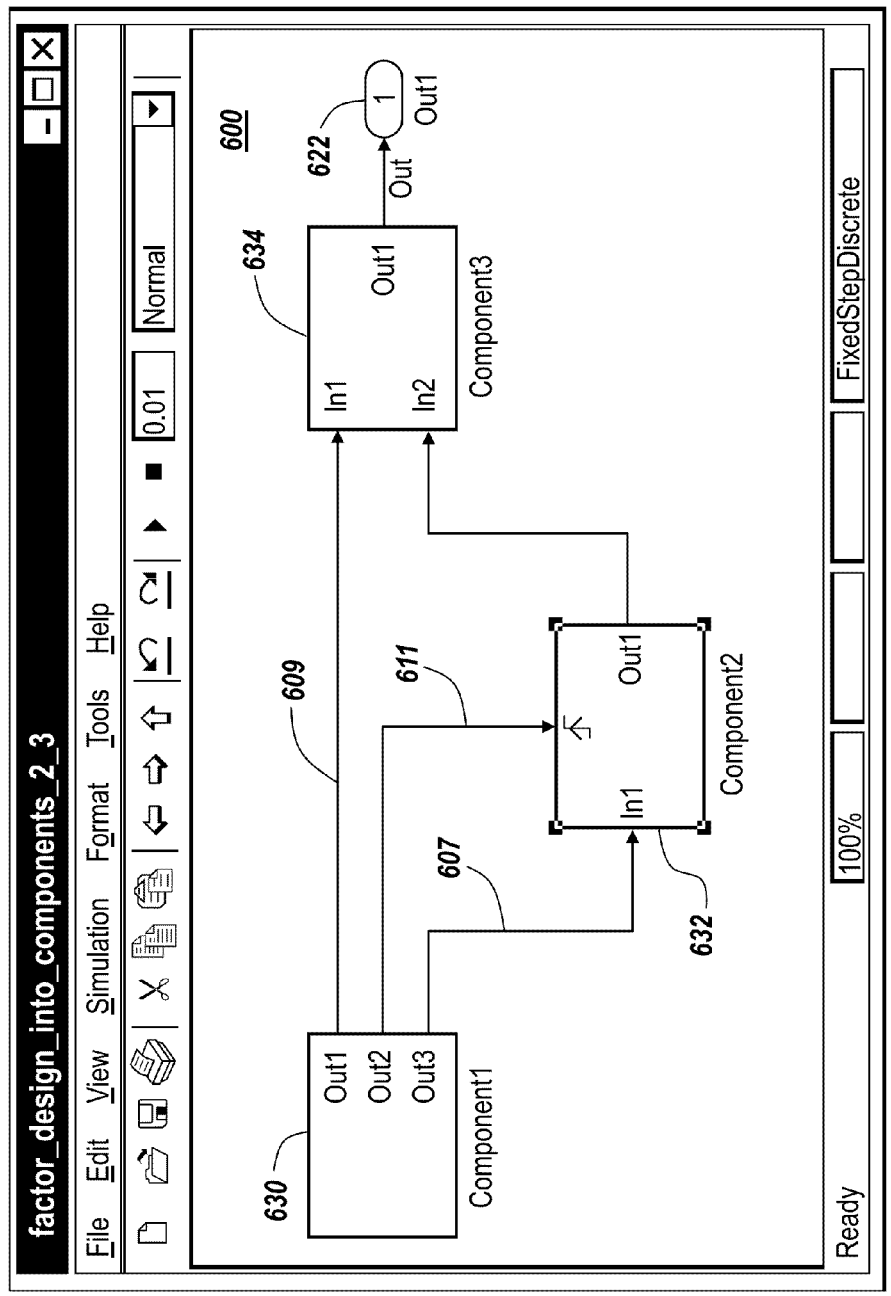
FIG. 6D depicts the exemplary BDE model of an application illustrated in FIG. 6A using the application components illustrated in FIGS. 6B-6C.

According to various embodiments, factorization may attempt to break components of an application into groups according to a criteria. For example, an application may be factored into groups using as few groups as possible. FIG. 6D illustrates an exemplary factorization result for block diagram 600. Blocks 616, 618 and 620 are designated as application component 632. Block 614 is designated as application component 634. As shown in FIG. 6D, exemplary factorization illustrated in FIGS. 6A-6C resulted in grouping blocks of diagram 600 into three application components 630, 632 and 634.

Application components 630, 632 and 634 of application 600 may be executed on an SMP using an interactive static scheduler or an interactive dynamic scheduler.

Figure 7A:
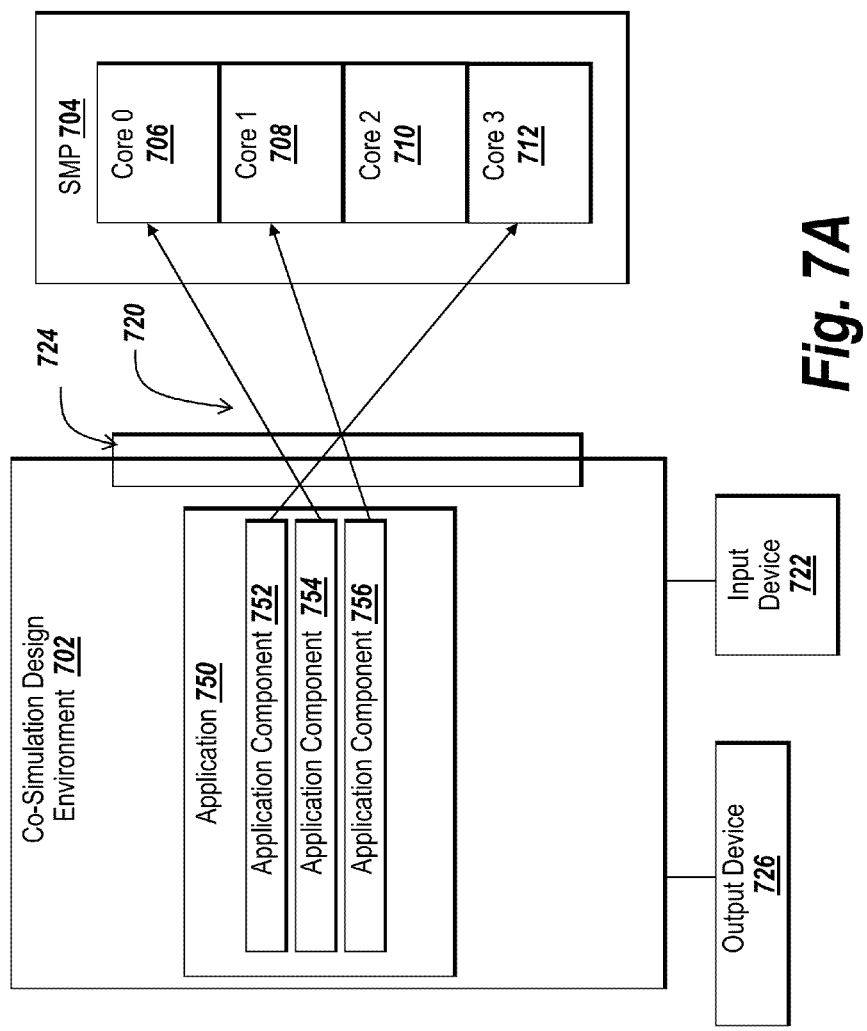
FIG. 7A depicts an exemplary scheduling scheme for a BDE model running in co-simulation environment.
Figure 7B:
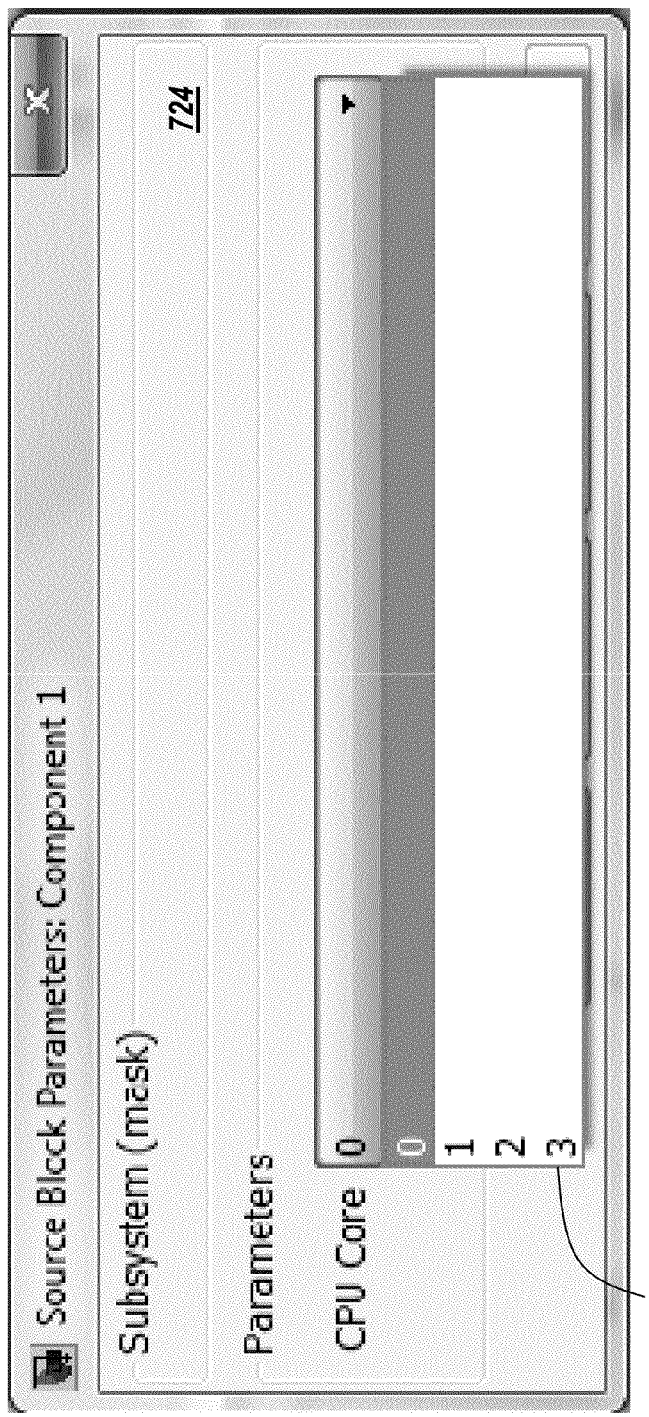
FIG. 7B depicts an exemplary interface for modifying the scheduling scheme illustrated in FIG. 7A.
Figure 7C:
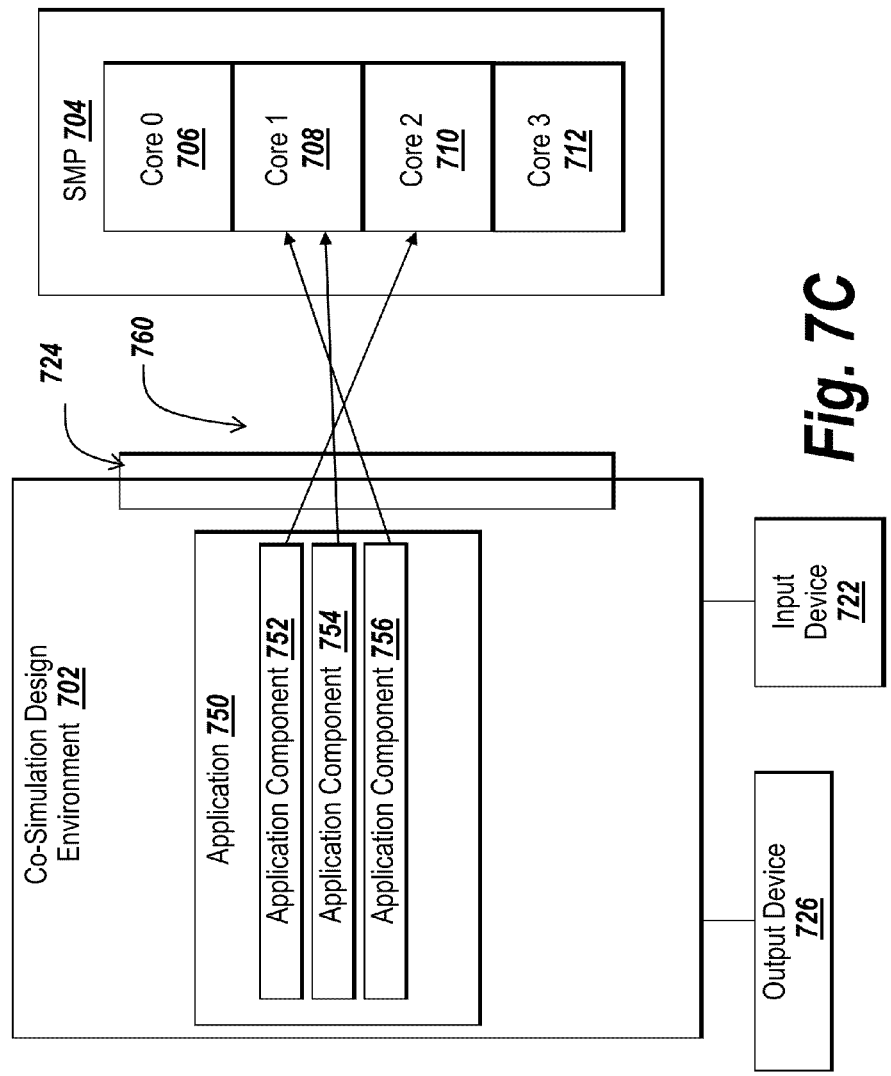
FIG. 7C depicts an exemplary modified scheduling scheme for the BDE model illustrated in FIG. 7A.

FIGS. 7A-7C depict interactively varying a scheduling scheme for application 750 during co-simulation. FIG. 7A depicts computing device 700 including co-simulation design environment 702 and SMP 704. Application components 752, 754 and 756 are provided in co-simulation design environment 702. SMP 704 includes four cores: core 706, core 708, core 710 and core 712. According to an exemplary scheduling scheme 720 illustrated in FIG. 7A, execution of application component 754 is assigned to core 706, execution of application component 756 is assigned to core 708 and execution of application component 752 is assigned to core 712.

During co-simulation, a user or a program can modify the mapping between the application components and cores of the SMP by re-allocating application components to different cores for execution. For example, via input device 722, a user may activate interface 724 displayed on output device 726. Interface 724 may be associated with application components 752, 754 and 756. According to various embodiments, interface 724 may be a graphical user interface (GUI) or an application programming interface (API). FIG. 7B illustrates an exemplary GUI as interface 724. Interface 724 allows a user to switch the execution of application component 754 from the currently selected core 706 to another core via graphical affordance 728. Graphical affordance 728 may include, for example, a button, a dropdown menu, a list, etc. The switch can be made from co-simulation design environment 702. For example, selecting a core on graphical affordance 728 of interface 724 may transfer execution of application component 754 from core 706 to core 708 when application component 754 is next invoked (i.e., the next time application component 754 runs). It should be noted that co-simulation may not need to be stopped during the core selection and execution transfer processes. That is, the execution of application component 754 is transferred from core 706 to another core without re-generating, re-compiling or re-running code for application component 754 or application components 752 and 756.

FIG. 7C illustrates an exemplary modified scheduling scheme 760 relative to the original scheduling scheme 720 shown in FIG. 7A. According to scheduling scheme 760 illustrated in FIG. 7C, application component 752 is mapped to core 710 and both application components 754 and 756 are mapped to core 708. No application component is mapped to core 706 or core 712. While modified scheduling scheme 760 alters which application components 752, 754, 756 are executed on which cores 706, 708, 710, 712, modified scheduling scheme 760 does not stop execution of application components 752, 754, 756. Modifying mapping of application components 752, 754, 756 from scheduling scheme 720 to scheduling scheme 760 does not require re-generating, re-compiling and re-running code for application components 752, 754, 756.

As provided above, an interactive static scheduler or a co-simulation dynamic scheduler may be used to modify the scheme assigning the execution threads associated with application components to processing cores on the SMP. That is, an interactive static scheduler or a co-simulation dynamic scheduler may be used to remap the execution threads associated with application components to different processing cores on the SMP during co-simulation. According to various embodiments, the scheduling scheme, i.e. the mapping between the execution threads and processing cores, may be modified by a user, such an algorithm or an application. The 'main.c' code illustrated below represents the main execution entry point of the application components to be executed on the target SMP. The 'main.c' code also refers to the main thread of the application components running on the SMP that receives instructions from the co-simulation environment and allocates the other application threads to processing cores. In this example, there is one thread representing one application component. The thread representing the application component is illustrated using a variable called 'baseRateThread' in the code. Additionally, the desired processor core number to which the application component is to be mapped is received from the host simulation environment and stored in a variable called 'cpuset' during co-simulation. With the statement, s=pthread_setaffinity_np(baseRateThread, sizeof(cpu_set_t), &cpuset); the thread, 'baseRateThread', is set to be executed on the processor core pointed to by 'cpuset' Since the processor core identification is parameterized, the core processors to execute the application components may be set and changed during co-simulation. Therefore, modifying the scheduling scheme does not require re-generating, re-compiling, and re-running the code for the application comprising the application components. Provided below is an exemplary C-code program that executes on the SMP for modifying the scheduling scheme without re-generating, re-compiling, and re-running code for the application components.

Generated Examplary C-code
```
include <stdio.h>
#include <sys/types.h>
#include <sys/socket.h>
#include <netinet/in.h>
void baseRateTask(void *arg)
{
    while (1) {
    /* Wait for the next timer interrupt */
    algorithm( );
    }
}
int main(argc, char *argv[ ])
{
    pthread_t baseRateThread;
```

```
pthread_attr_t attr;
struct sched_param sp;
int sockfd, newsockfd, portno, clilen;
struct sockaddr_in serv_addr, cli_addr;
int n;
cpu_set_t cpuset;
/* Set scheduling policy of the main thread to SCHED_
    FIFO */
sp.sched_priority=sched_get_priority_max(SCHED_
FIFO);
ret=sched_setscheduler(0, SCHED_FIFO, &sp);
/* Set thread attributes */
pthread_attr_init(&attr);
ret=pthread_attr_setinheritsched(&attr, PTHREAD_EX-
PLICIT_SCHED);
    CHECK_STATUS(ret, "pthread_attr_setinheritsched");
    ret=pthread_attr_setschedpolicy(&attr, SCHED_FIFO);
    CHECK_STATUS(ret, "pthread_attr_setschedpolicy");
    ret=pthread_attr_setdetachstate(&attr, PTHREAD_CRE-
ATE_DETACHED);
    CHECK_STATUS(ret, "pthread_attr_setdetachstate");
    stackSize=131072+PTHREAD_STACK_MIN;
    ret=pthread_attr_setstacksize(&attr, stackSize);
    CHECK_STATUS(ret, "pthread_attr_setstacksize");
    sp.sched_priority=40;
    ret=pthread_attr_setschedparam(&attr, &sp);
    /* Create thread that executes base rat function*/
    ret=pthread_create(&baseRateThread, &attr, (void *)
baseRateTask, (void *)0);
    /* Open a TCP socket and receive CPU mask from remote
        host */
    /* Use this CPU mask to modify the processor core that the
        baseRateThread */
    /* can run. Note that the received message contains a bit
        field that signifies */
    /* A set of cores. */
    sockfd=socket(AF_INET, SOCK_STREAM, 0);
    if (sockfd<0) {
        error("ERROR opening socket");
    }
    bzero((char *) &serv_addr, sizeof(serv_addr));
    portno=atoi(argv[1]);
    serv_addr.sin_family=AF_INET;
    serv_addr.sin_addr.s_addr=INADDR_ANY;
    serv_addr.sin_port=htons('10000');
    if(bind(sockfd, (struct sockaddr *) &serv_addr, sizeof(ser-
        v_addr))<0) {
        error("ERROR on binding");
    }
    listen(sockfd, 5);
    clilen=sizeof(cli_addr);
    newsockfd=accept(sockfd, (struct sockaddr *) &cli_addr,
&clilen);
    if (newsockfd<0) {
        error("ERROR on accept");
    }
    /* begin receiving messages from host */
    CPU_ZERO(&cpuset);
    while (1) {
        n=read(newsockfd, (char *)&cpuset, 8); /* cpuMask is a
            long long→8 bytes */
        if (n<0) {
            error("ERROR reading from socket");
        }
        s=pthread_setaffinity_np(baseRateThread, sizeof(cpu-
            _set_t), &cpuset);
    }
    return 0;
}
```

The ability to modify the scheduling scheme of application components as illustrated in FIGS. 7A-7C gives a user the ability to determine an allocation of application components to cores to provide things, such as but not limited to, improved load balancing on the SMP, faster execution of the application, improved processing efficiency and optimal memory usage. In an embodiment, a user can determine a best or optimum allocation of application components to cores. The user may use real-time information, such as statistics about the cores processing the application components, to better determine which modifications may improve processing efficiency among the cores. For example, relevant runtime statistics, such as CPU load and memory usage, may be streamed back to the co-simulation design environment from the target SMP in real time, i.e. while the code for the application components is being executed on the target SMP. Accordingly, it may be beneficial to provide relevant runtime statistics to the co-simulation design environment where the user can access the runtime statistics.

Figure 8A:
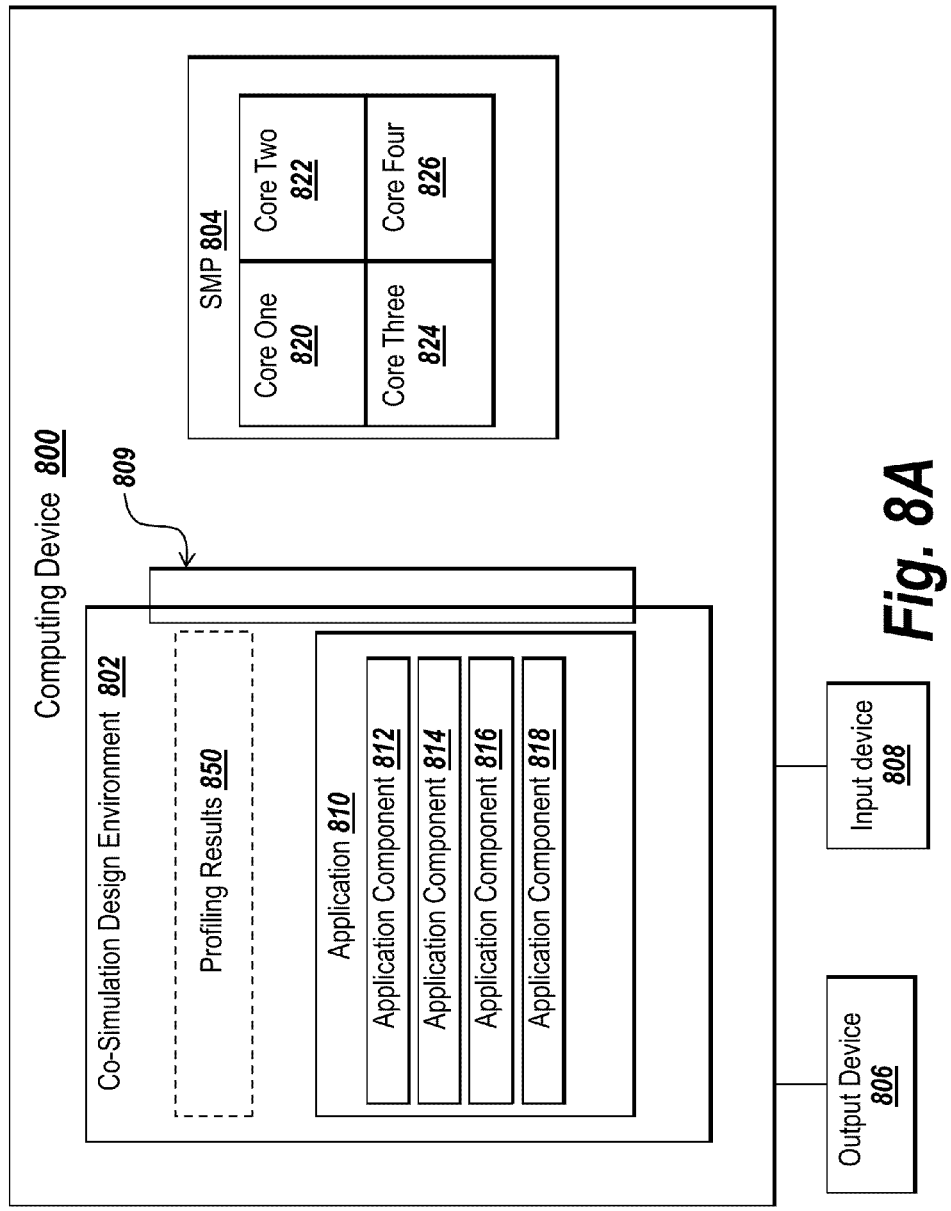
FIG. 8A depicts an exemplary environment suitable for providing profiling results in the co-simulation design environment.

According to various embodiments, the target SMP may send continuous runtime statistics updates to the co-simulation design environment. As illustrated in FIG. 8A, profiling results 850 may be generated during execution of application 810 including application components 812, 814, 816 and 818 and provided to co-simulation design environment 802 from SMP 804 in real-time, i.e., while application 810 is executing. Profiling results may include performance statistics associated with cores 820, 822, 824, 826 of SMP 804. For example, profiling results 850 may include, but are not limited to, metrics and/or runtime statistics associated with the execution of application 810 on SMP 804. Exemplary profiling results 850 may include processor load (a metric associated with the execution utilization of a core), memory usage, stack usage, cache utilization (e.g., hit/miss statistics), etc. Profiling results 850 may also include metrics relating to a buffer allocation, algorithm data synchronization, an inter-thread wait time, resource utilization by other applications and the execution priorities of those applications.

A portion of the profiling results may be provided to the user in various graphical and/or textual formats, if desired. For example, profiling results 850 may be provided on output device 806. Based on the profiling results, the user may change the interactive static or dynamic scheduling scheme to improve execution efficiency of the code including but not limited to increasing execution speed, minimizing memory usage, improving load distribution across cores, minimizing power consumption, minimizing communication among the cores, etc. For example, the user may change the mapping of application components 812, 814, 816, 818 to cores 820, 822, 824, 826 using interface 809 via input device 808 for faster execution or to better meet application design constraints.

According to various embodiments, relevant runtime statistics may be provided in the co-simulation design environment and back-annotated to corresponding application components. For example, runtime statistics associated with each application component may be displayed in the co-simulation design environment along with the corresponding application component.

Figure 8B:
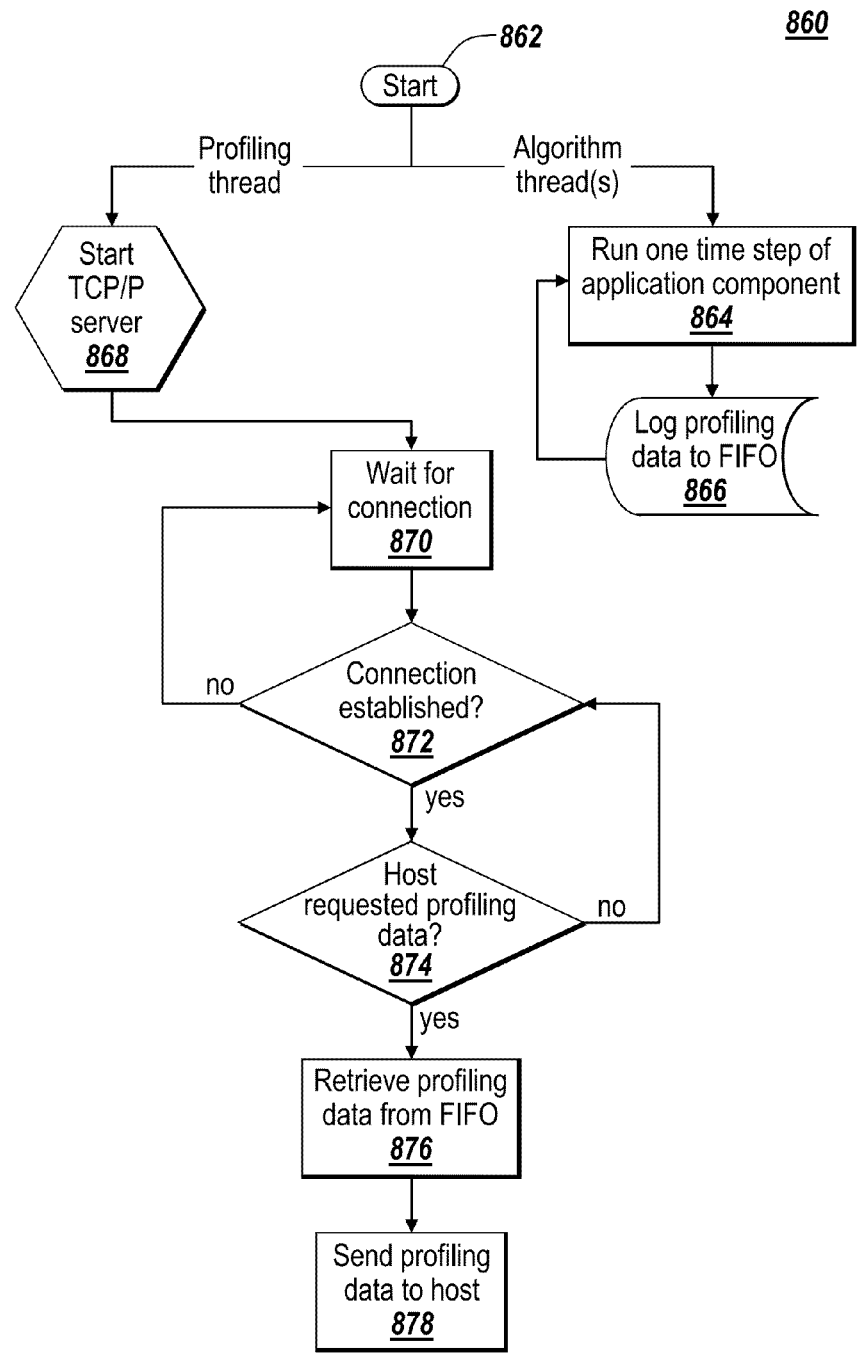
FIG. 8B depicts a flowchart illustrating exemplary processing for the SMP to send profiling results to the co-simulation design environment.
Figure 8C:
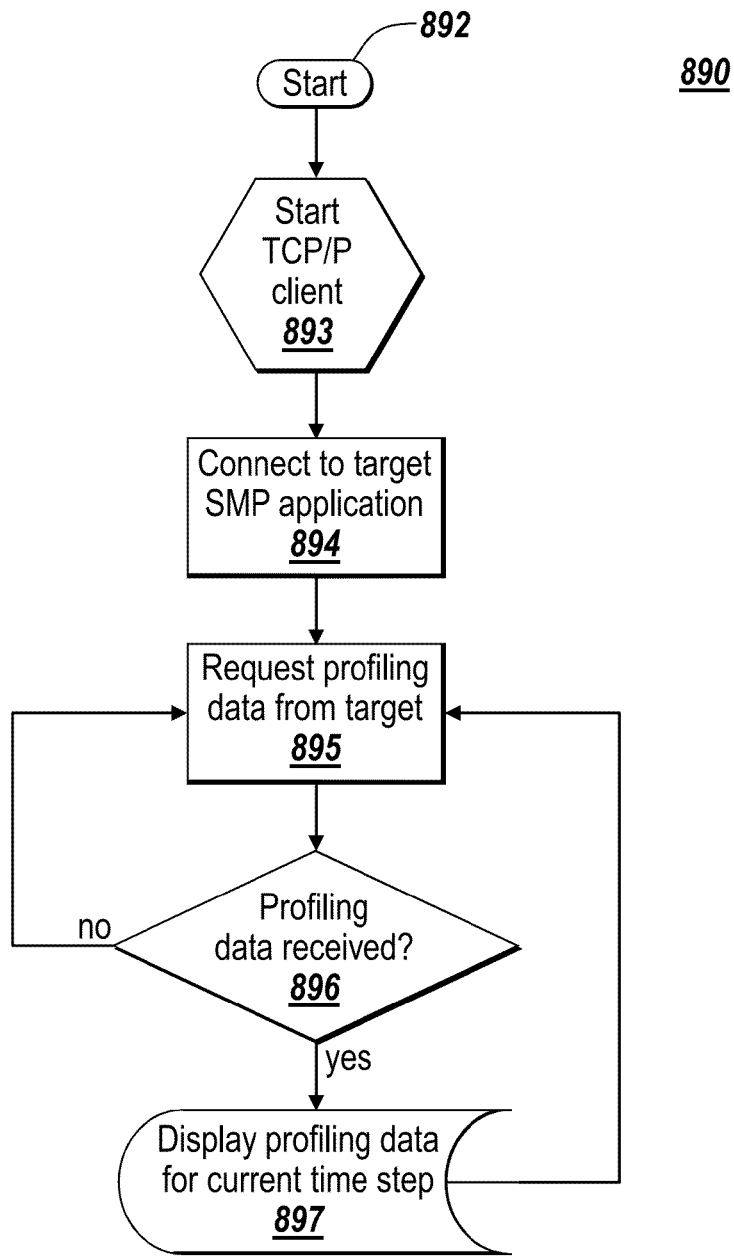
FIG. 8C depicts a flowchart illustrating exemplary processing for an application component running on the co-simulation design environment to receive profiling results from the SMP and to display.

FIGS. 8B-8C illustrate exemplary flowcharts illustrating how the runtime statistics may be provided in the co-simulation design environment.

FIG. 8B illustrates an exemplary flowchart 880 where the application component is running on SMP during co-simulation. The execution of an algorithm component is started on the target SMP (block 862). One time step of application component is run on the target SMP (block 864). Profiling results associated with running one time step on the target SMP are logged on a first input first output (FIFO) structure (block 866). The profiling results may be sent from SMP to the co-simulation design environment using a TCP/IP server. TCP/IP server is started for sending the profiling results to the co-simulation design environment (block 868). The receiver, i.e. the co-simulation design environment, may wait for connection with client, i.e. the SMP, (block 870). When it is determined that the connection with client, i.e. the SMP, is established (block 872), the system determines if the co-simulation design environment requested profiling results (block 874). If the co-simulation design environment requested the profiling results, the profiling results is retrieved from FIFO (block 876) and sent to the co-simulation design environment (block 878).

Exemplary C-code that implements the flowchart illustrated in FIG. 8B is provided below.

```
include <stdio.h>
#include <sys/types.h>
#include <sys/socket.h>
#include <netinet/in.h>
#define FIFO_SIZE (8192)
#define REQUEST_PROFILING_DATA (0x1)
#define FLUSH_PROFILING_DATA (0x2)
unsigned long long profilingFIFO[FIFO_SIZE];
int head=0;
int tail=0;
/* This is the OS thread that runs the algorithm and collects the profiling results */
void algorithmTask (void *arg)
{
   struct timespec tic, toc;
   unsigned long long runTime;
   while (1) {
   /* Run one step of the algorithm */
   clock_gettime(CLOCK_REALTIME, &tic);
   algorithm( );
   clock_gettime(CLOCK_REALTIME, &toc);
   /* Compute run time in nano seconds an store in profiling FIFO */
   runtime=(toc.tv_sec-tic.tv_sec)*1e9+(toc.tv_nsec-
      tic.tv_nsec);
   if (tail>=head) {
      profilingFIFO[tail]=runtime;
      tail=tail+1;
      if (tail>FIFO_SIZE) {
         tail=0;
      }
   }
   }
}
/* Target application program entry point */
int main(argc, char *argv[ ])
{
   pthread_t algorithmThread, profilingThread;
   pthread_attr_t attr;
   int sockfd, newsockfd, clilen, n;
   struct sockaddr_in serv_addr, cli_addr;
   char recvBuf[10];
   /* Create thread executing algorithm */
   pthread_attr_init(&attr);
      ret=pthread_create(&algorithmThread, &attr, (void *)
   algorithmTask, (void *)0);
      if (ret<0) {
      error("ERROR creating algorithm thread");
   }
   /* Open a TCP/IP socket to upload profiling results to remote host */
   sockfd=socket(AF_INET, SOCK_STREAM, 0);
   if (sockfd<0) {
   error("ERROR opening socket");
   }
   bzero((char *) &serv_addr, sizeof(serv_addr));
   serv_addr.sin_family=AF_INET;
   serv_addr.sin_addr.s_addr=INADDR_ANY;
   serv_addr.sin_port=htons('10000');
   if (bind(sockfd, (struct sockaddr *) &serv_addr, sizeof
(serv_addr))<0)
   {
   error("ERROR on binding");
   }
   listen(sockfd, 2);
   clilen=sizeof(cli_addr);
   newsockfd=accept(sockfd, (struct sockaddr *) &cli_addr,
&clilen);
   if (newsockfd<0) {
   error("ERROR on accept");
   }
   /* Begin receiving messages from remote host */
   while (1) {
   n=read(newsockfd, recvBuf, 1);
   if (n<0) {
      error("ERROR reading from socket");
   }
   switch (recvBuf[0]) {
      case REQUEST_PROFILING_DATA:
         if (tail>=head) {
            send(newsockfd, (char *)&profilingFIFO[head],
               8);
            head=head+1;
            if (head>FIFO_SIZE) {
               head=0;
            }
         }
         break;
      case FLUSH_PROFILING_DATA:
         /* Flush profiling results */
         head=head+1;
         break;
   }
   }
   return 0;
}
```

As provided above, one or more application components of the application provided in the co-simulation design environment may execute on the SMP while other application component(s) may execute on the co-simulation design environment. FIG. 8C illustrates an exemplary flowchart 890 where an application component of the application is running on the co-simulation design environment during co-simulation. The execution of algorithm component is started on the co-simulation design environment (block 892). As the application executes in co-simulation, one or more application components of the application execute on the SMP. The profiler results for those application components running on the SMP may be sent from SMP to the co-simulation design environment using a TCP/IP server. TCP/IP server is started for sending the profiling results to the co-simulation design environment (block 893). The co-simulation design environment connects to the TCP/IP server for receiving the profiling results for those application components running on the SMP from the target SMP (block 894). The receiver, i.e. the co-simulation design environment, may request the profiling results of the application components running on the SMP from the SMP (block 895). The system then determines if the profiling results for current time step has been received (block 896). If the profiling results for current time step has been received, the profiling results is displayed for the current time step (block 897).

An exemplary C-code that implements the flowchart illustrated in FIG. 8C is provided below.

```
#define REQUEST_PROFILING_DATA (0x1)
#define FLUSH_PROFILING_DATA (0x2)
void simulationLoop(char *targetIP, unsigned short serverPort)
{
    int sock; /* Socket descriptor */
    struct sockaddr_in serv_addr; /* Server address */
    char *echoString;
    char buff[BUFSIZE];
    int bytesRcvd;
    /* Create a TCP socket to talk to target application */
    if ((sock=socket(AF_INET, SOCK_STREAM, IPPROTO_TCP))<0) {
        error("socket( ) failed");
    }
    /* Construct the server address structure */
    memset(&serv_addr, 0, sizeof(serv_addr));
    serv_addr.sin_family=AF_INET;
    serv_addr.sin_addr.s_addr=inet_addr(targetIP);
    serv_addr.sin_port=htons(serverPort);
    /* Establish the connection to the echo server */
    if (connect(sock, (struct sockaddr *)&serv_addr, sizeof (serv_addr))<0)
        error("connect( ) failed");
    }
    while (simulationMode==SIMULATION_RUNNING) {
        /* Request profiling results from target application */
        buff[0]=REQUEST_PROFILING_DATA;
        if (send(sock, 1, buff, 0) !=1) {
            error("send( ): Error sending data");
        }
        /* Receive profiling results from target application */
        bytesRcvd=recv(sock, buff, 8, 0));
        if (bytesRcvd<0) {
            error("recv( ) failed or connection closed prematurely");
        }
        if (bytesRcvd==8) {
            /* Display received profiling results */
            displayProfilingData(unsigned long long buff[0]);
        }
    }
}
```

According to various embodiments, flowchart 880 illustrated in FIG. 8B and flowchart 890 illustrated in FIG. 8C may be active simultaneously during co-simulation to illustrate that the profiler results may be received on the co-simulation design environment during co-simulation. Flowchart 880 illustrated in FIG. 8B describes the application running on the SMP and flowchart 890 illustrated in FIG. 8C describes the application running on the co-simulation design environment. Accordingly, there may be communication and/or synchronization between flowchart 880 and flowchart 890.

FIGS. 9A-12B illustrate how the profiling results may be annotated back to the co-simulation design environment and used to alter the mapping between the execution of the applications components and the processing cores.

Figure 9A:
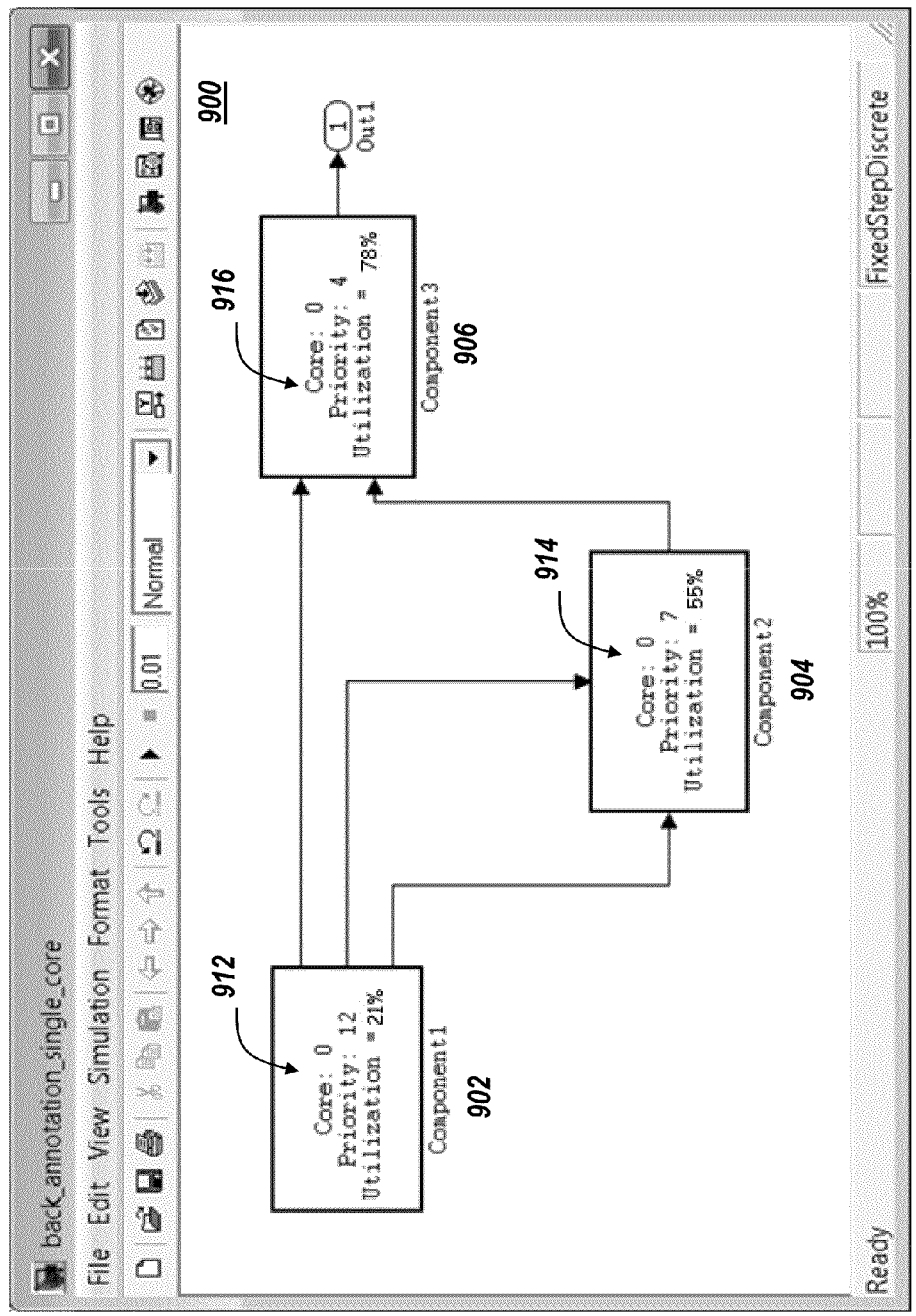
FIG. 9A depicts an exemplary BDE model running in co-simulation with back-annotation of profiling results associated with the execution of application components on an SMP.

FIG. 9A illustrates exemplary BDE model 900 including application components 902, 904 and 906. The application components 902, 904 and 906 are augmented with information such as back-annotation of profiling results, i.e. runtime statistics, from an initial mapping. In FIG. 9A, runtime statistics associated with each application component are displayed along with the corresponding application component. For example, back-annotated runtime statistics 912 for application component 902 indicate that application component 902 is executed on core 0 with execution priority of 12 and uses up 21% of the processing resources of core 0 when executing. Back-annotated runtime statistics 914 for application component 904 indicate that application component 904 is executed on core 0 with execution priority of 7 and uses up 55% of the processing resources of core 0 when executing.

Back-annotated runtime statistics 916 for application component 906 indicate that application component 906 is executed on core 0 with execution priority of 4 and uses up 78% of the processing resources of core 0 when executing. The utilization percentage illustrated in back-annotated runtime statistics 912, 914, and 916 refers to the percentage of execution capacity of the specified processing core that the associated component uses. The runtime statistics for application components 902, 904 and 906 illustrated in FIG. 9A indicate that all components have been mapped to execute on core 0 on the target SMP. A user may wish to modify the mapping so that more than one core are used to execute application components 902, 904 and 906.

Figure 9B:
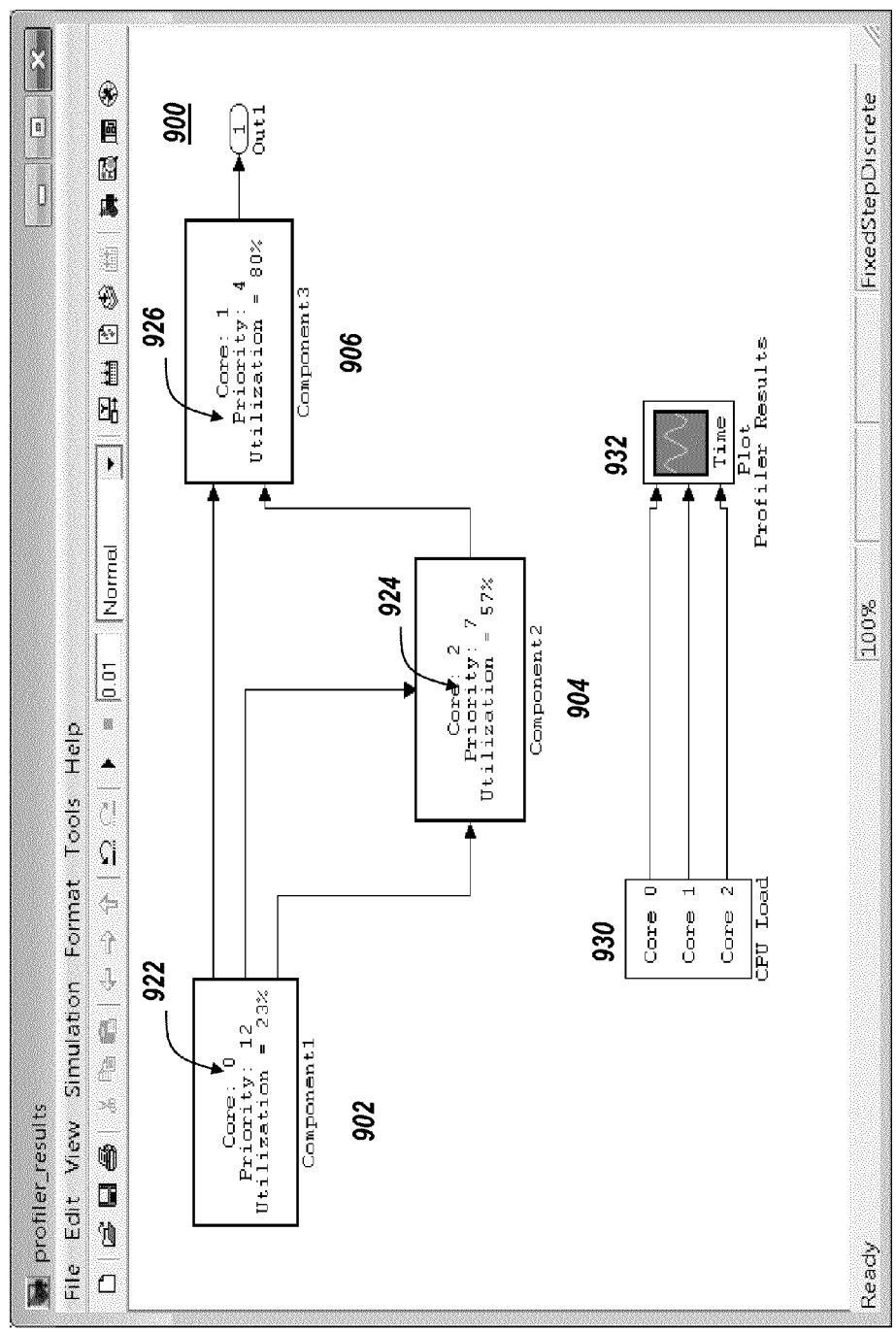
FIG. 9B depicts an exemplary BDE model running in co-simulation and configured to display plots of profiling results by core.

During co-simulation, a user presented with profiling results may interactively modify the scheduling scheme for an application by re-allocating components to different cores for execution. FIG. 9B depicts model 900 during co-simulation in which the profiling statistics for the components have been updated following an interactive static or dynamic varying of the scheduling scheme to reassign application component 904 and application component 906 to execute on cores 2 and core 1, respectively. Following the static or dynamic re-scheduling of the application components to execute on different cores, the back-annotation of profiling results 912 for application component 902 indicate that application component 902 still executes on core 0, now with execution priority set to 12 and using up 23% of the processing resources of core 0 when executing.

Back-annotation of profiling results 914 for application component 904 indicates that application component 904 now executes on core 2 with execution priority set to 7 and using up 57% of the processing resources of core 2 when executing. Back-annotation of profiling results 916 for application component 906 indicates that application component 906 now executes on core 1 with execution priority set to 4 and using up 80% of the processing resources of core 1 when executing.

Comparing the execution profiling results of the modified scheduling scheme illustrated in FIG. 9B with the profiling results of the scheduling scheme illustrated in FIG. 9A, it can be determined that the utilization of each component has increased. The increased utilization may be, for example, due to additional communications overhead associated with transferring data between different cores. In the modified scheduling scheme, only application component 902 executes on core 0, thereby reducing the load on core 0. Accordingly, the overall load has been more effectively balanced across the multiple cores.

Figure 9C:
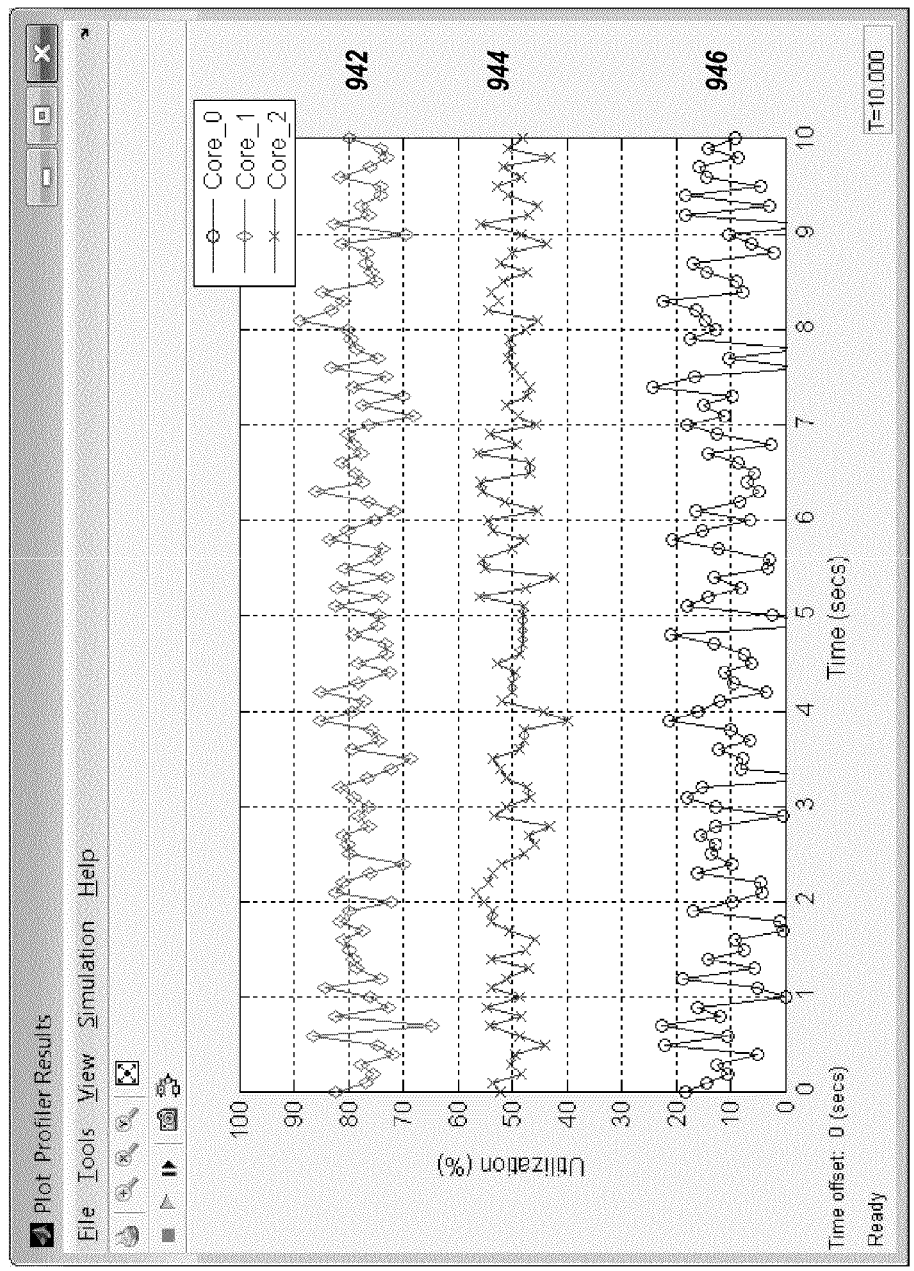
FIG. 9C depicts an exemplary plot of execution profiling results during co-simulation for each of the target processor cores associated with the exemplary BDE model illustrated in FIG. 9B.

Profiling results of the modified scheduling scheme illustrated in FIG. 9B can be visually provided on an output device. For example, CPU load 930 for each core can be processed and may be graphically represented, e.g., using a scope block 932 and a plot. FIG. 9C depicts exemplary plots 942, 944, 946 of profiling results for each target processor core respectively, during co-simulation of application components 902, 904, 906 as depicted in FIG. 9C. In plots 942, 944, 946, the utilization percentage over time for core 1, core 2 and core 0, respectively, is displayed and tracks the profiling results displayed in FIG. 9B.

Based on utilization graph 942 of core 1 illustrated in FIG. 9C, the user may determine that resources of core 1 are being used close to the maximum level. Accordingly, the user may choose to avoid mapping another application component to core 1 in order to prevent core 1 from overloading or generating errors. On the other hand, utilization graph 946 of core 0 illustrated in FIG. 9C indicates that resources of core 0 are being used at a minimum level. Accordingly, the user may choose to map other application components to core 0 in order to better distribute the load between cores 1 and 2.

According to various embodiments, the design of an application may be re-factored during co-simulation. As provided above, FIGS. 6A-6D illustrate exemplary BDE model 600 being factored into three application components 630, 632 and 634. Embodiments allow re-factorization of model 600.

Figure 10A:
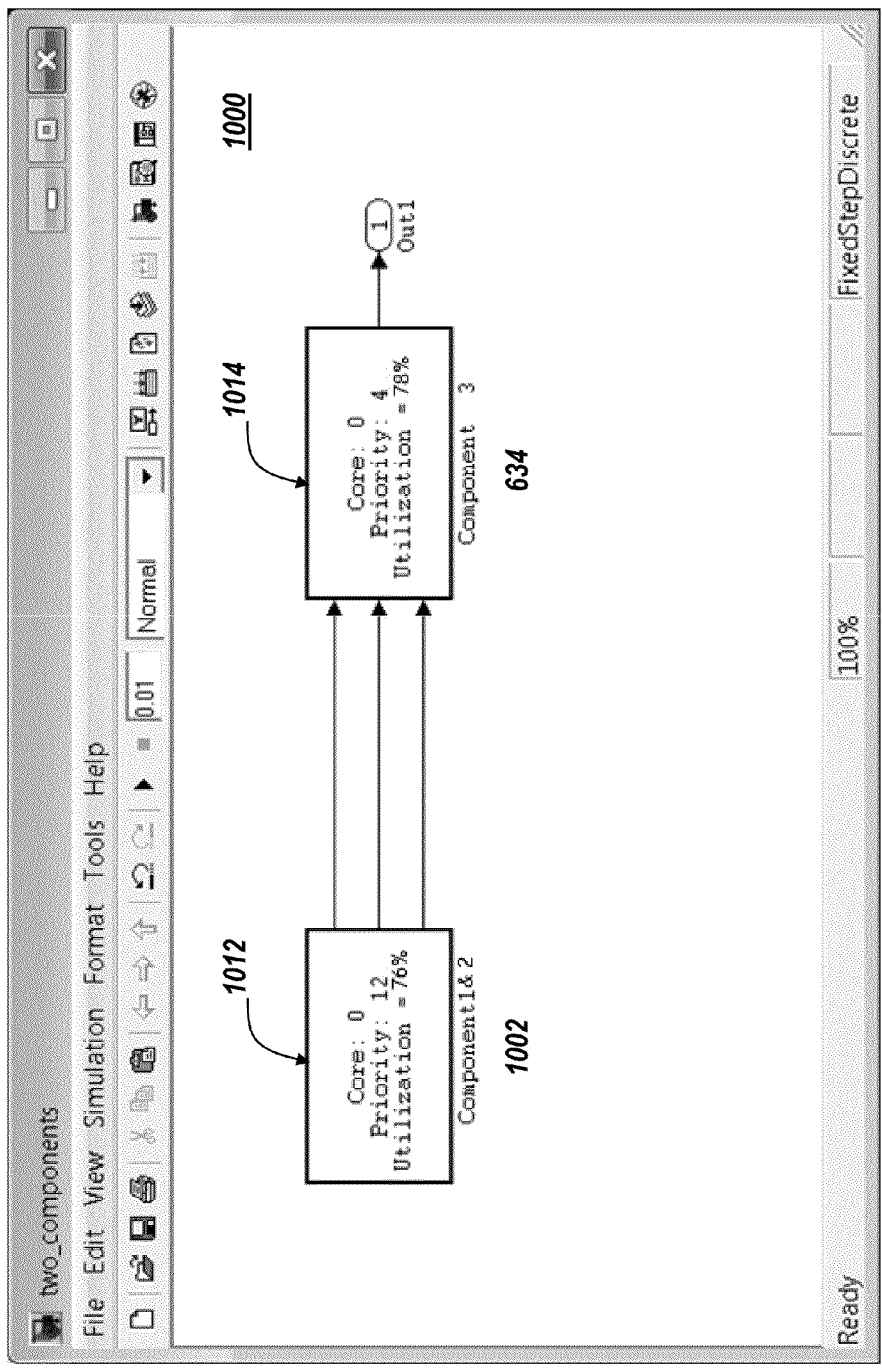
FIG. 10A depicts the exemplary BDE model of FIG. 6 grouped into two application components so as to determine a desired manner of complying with design requirements.

For example, application components 630 and 632 of model 600 can be combined into a single component. FIG. 10A illustrates exemplary re-factored BDE model 1000 where application component 634 of BDE model 600 remains intact. However, in re-factored BDE model 1000, application components 630 and 632 of BDE model 600 are combined together and represented by a new application component 1002. Following re-factorization, the profiling results of application components 1002 and 634 may be annotated back to BDE model 1000. As illustrated in profiling results 1012 of application component 1002, application component 1002 may be assigned to core 0 for processing. Application component 1002 uses up to 76% of resources of core 0. The utilization rate for new application component 1002 is equal to the sum of the utilization rates for two application components 630 and 632 together. Profiling results 1014 associated with application component 634 illustrate that application component is assigned to core 0 for processing, where application component 1002 uses up to 78% of resources of core 0.

Figure 10B:
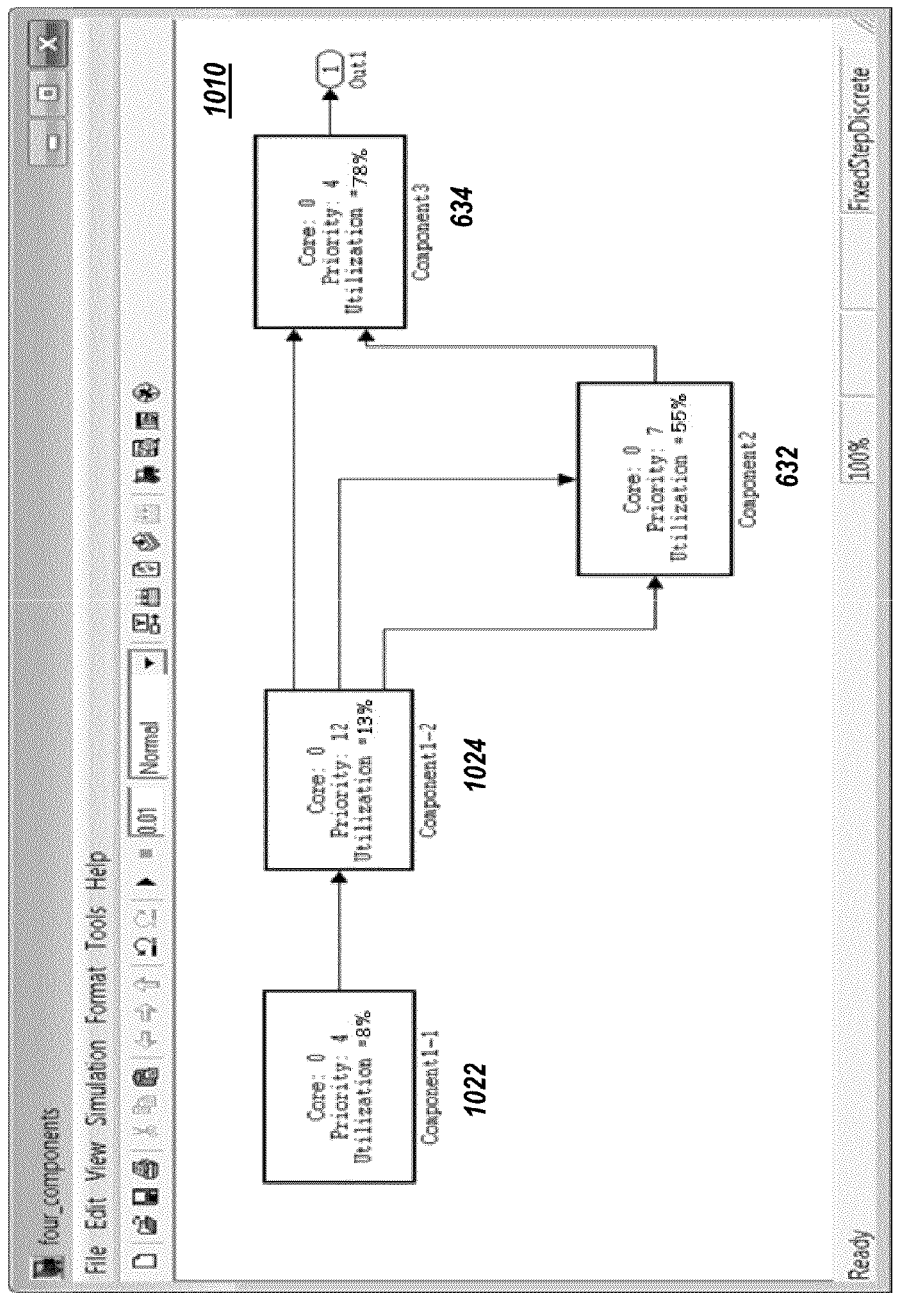
FIG. 10B depicts the exemplary BDE model of FIG. 6 grouped into four application components so as to determine a desired manner of complying with design requirements.

FIG. 10B illustrates another exemplary re-factored BDE model 1010 where application component 632 and application component 634 of BDE model 600 remain intact. However, in re-factored BDE model 1010, application component 630 of BDE model 600 is divided into two separate application components, i.e. application component 1022 and application component 1024. If application component 630 of BDE model 600 was assigned to core 0 for execution, following the re-factorization, application components 1022 and 1024 of BDE model 1010 may be initially assigned to core 0.

Figure 11A:
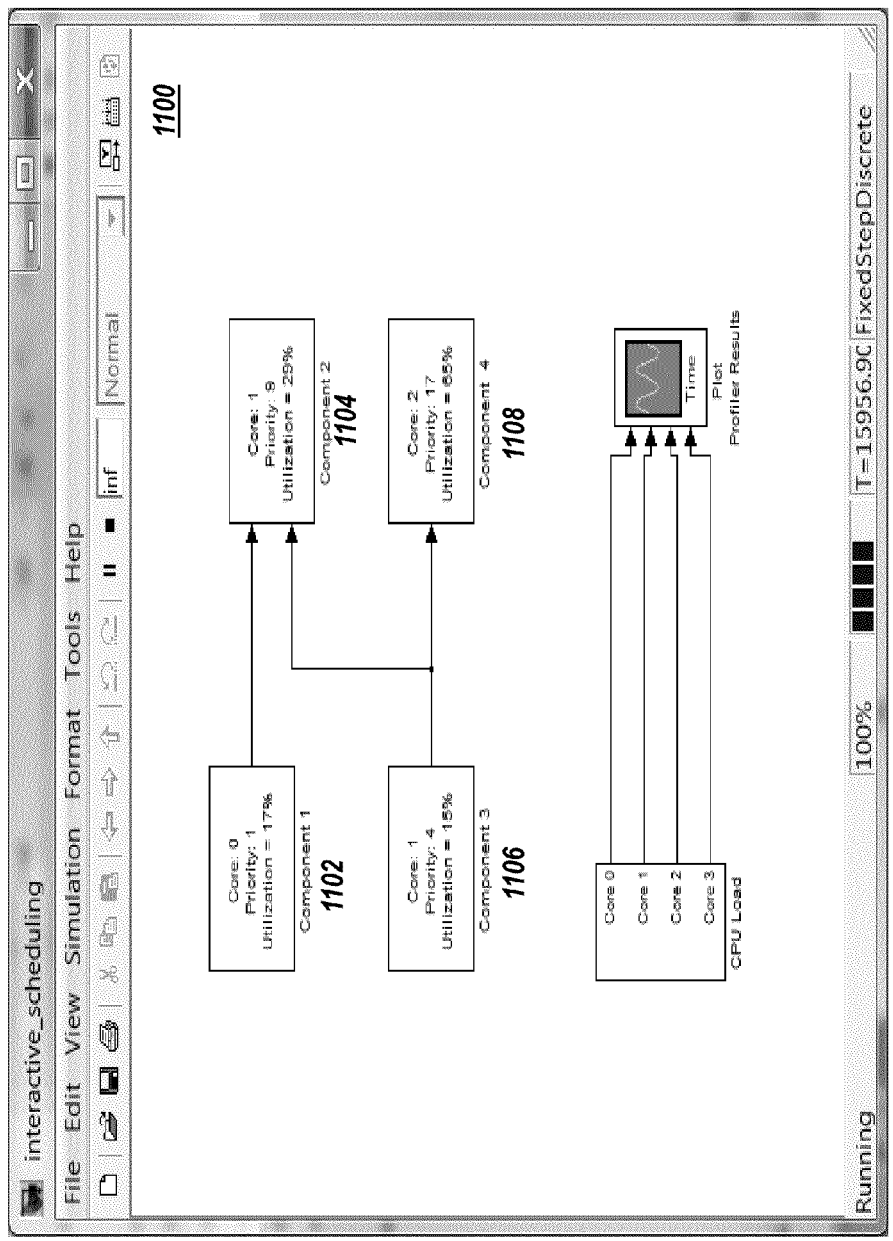
FIG. 11A depicts an exemplary BDE model executing in co-simulation with the target SMP.

FIG. 11A depicts an exemplary embodiment in a BDE where a scheduling scheme that satisfies design requirements for a BDE model is determined. Exemplary BDE model 1100 illustrated in FIG. 11A may execute in co-simulation with an SMP. The exemplary application illustrated in FIG. 11A via BDE model 1100 is factorized into application components 1102, 1104, 1106 and 1108. Runtime statistics of the SMP are back-annotated to application components 1102, 1104, 1106 and 1108. The profiling results indicate the identity of a core on which each application component is executing, and/or a priority assigned to the application component and a utilization percentage of the core on which the application component is executing.

The CPU load, i.e. utilization percentage, of a specific core is the sum of all application component utilizations for that core. FIG. 11A illustrates that application component 1104 and application component 1106 are both executed on core 1, for example core 520 of SMP 516 illustrated in FIG. 5. The utilization rate for application component 1104 is 29% and the utilization rate for application component 1106 is 15%. Accordingly, the utilization rate of core 1 is the sum of the utilization rates for application component 1104 and application component 1106, which is equal to 44%. The utilization percentage of the cores may be displayed in a graphical plot such as plots 1112, 1114, 1116 and 1118 shown in FIG. 11B. Plots 1112, 1114, 1116 and 1118 graphically depict core utilization on the target SMP, e.g. SMP 516, over time for model 1100 that is being co-simulated according to the scheduling scheme illustrated in FIG. 11A.

Figure 11B:
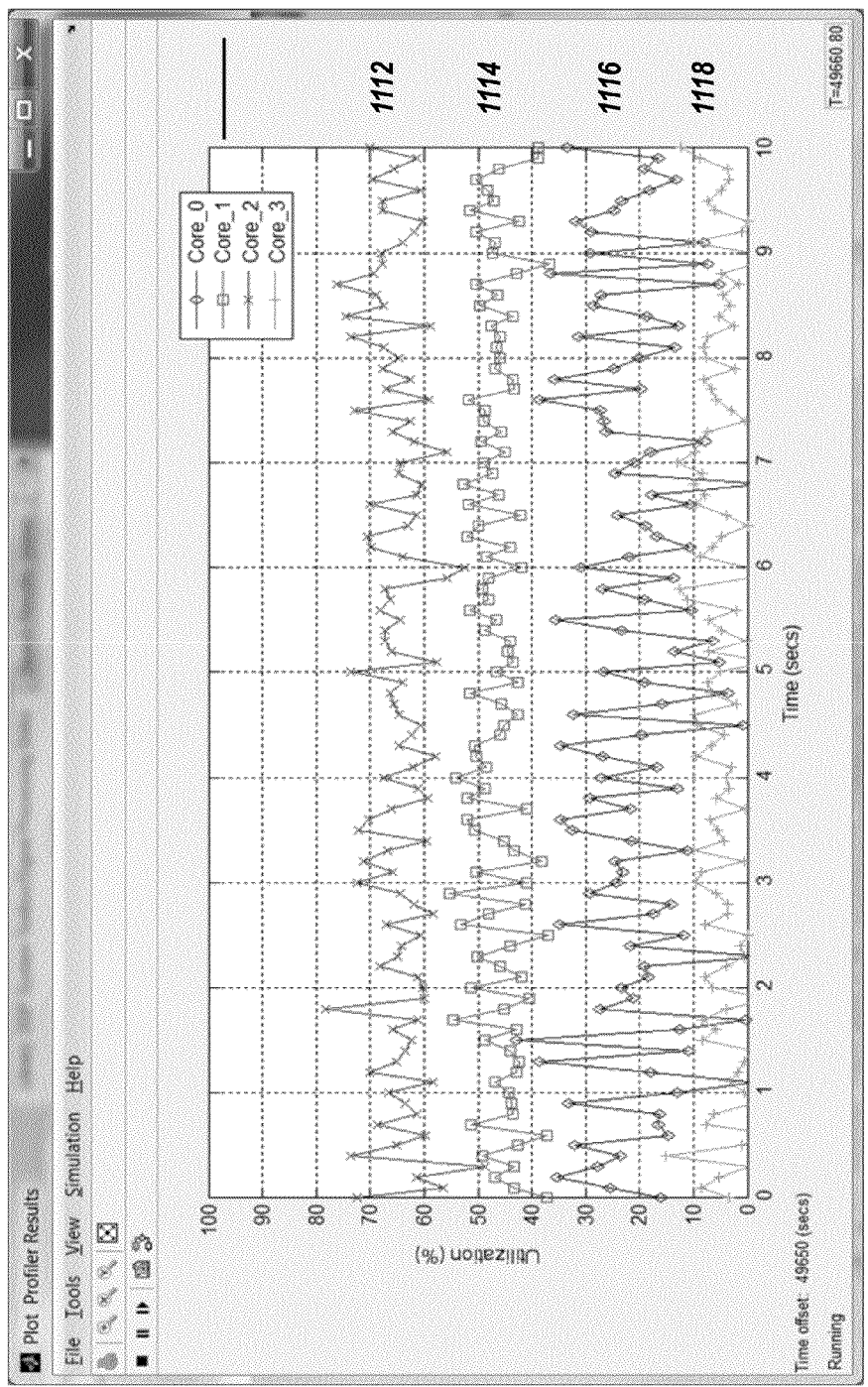
FIG. 11B depicts an exemplary plot of profiling results for the exemplary BDE model illustrated in FIG. 11A showing CPU load by core.

Based on the profiling results illustrated in FIG. 11B, no application component was assigned to core 3, for example core 524 of SMP 516 illustrated in FIG. 5. Accordingly, graph 1118 for core 3 indicates an utilization rate of about 0%. As provided above, the utilization rate of core 1 is the sum of the utilization rates for application component 1104 and application component 1106, which is equal to 44%. Graph 1114 for core 1 indicates a utilization rate of about 44%. The runtime statistics provided on FIG. 11A show that the utilization rate of core 0, for example core 518 of SMP 516 illustrated in FIG. 5, is 17% and the utilization rate for core 2, for example core 522 of SMP 516 illustrated in FIG. 5, is 65%. Accordingly, graph 1116 for core 0 indicates a utilization rate of about 17% and graph 1112 for core 2 indicates an utilization rate of about 65%. The graph provides visual representation to the user illustrating the utilization rates of all cores on SMP 516. Accordingly, the user can determine if the application components should be re-mapped among the cores using a different scheduling scheme.

Figure 12A:
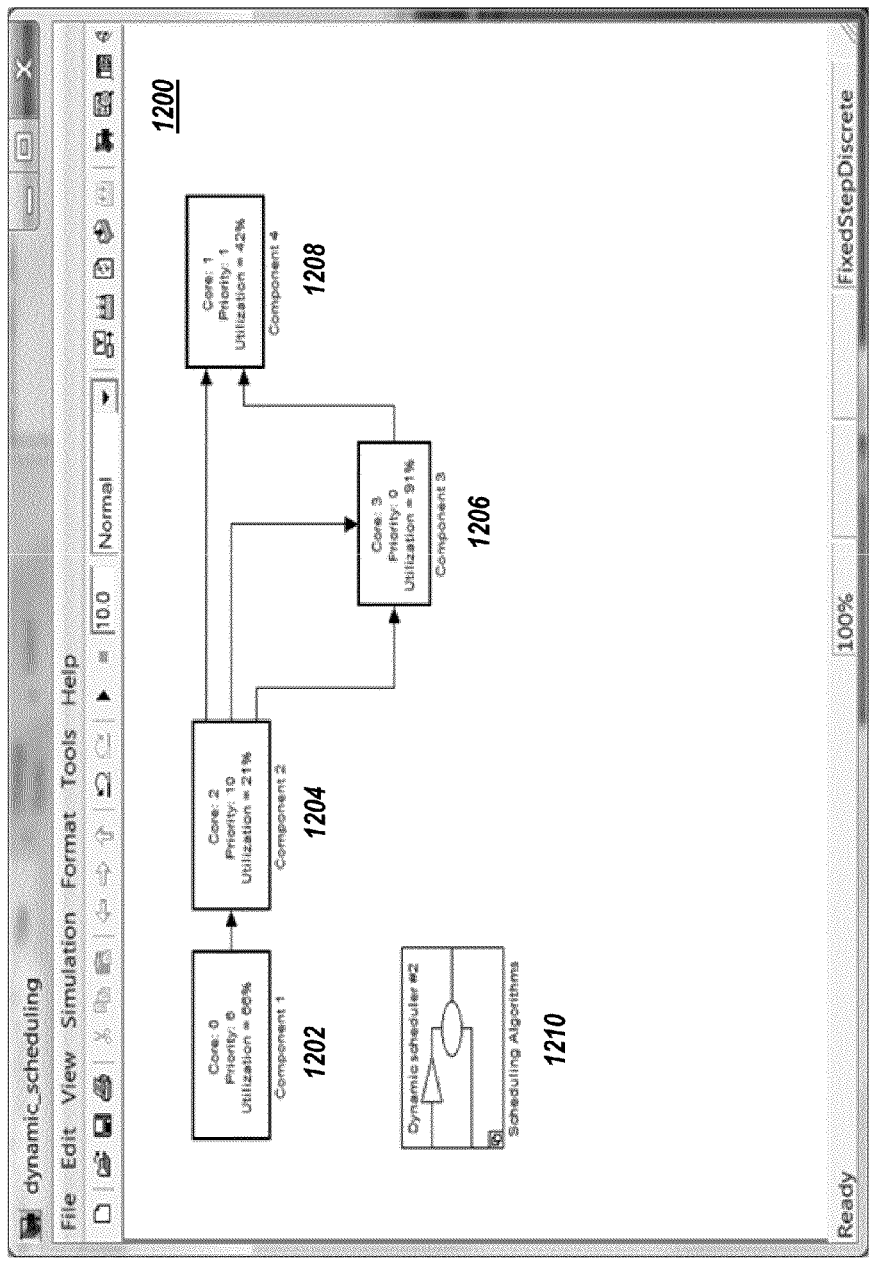
FIG. 12A depicts an exemplary BDE model representing an application having four application components and a block representing two co-simulation dynamic schedulers that can be selected during co-simulation as further illustrated in FIG. 12B.
Figure 12B:
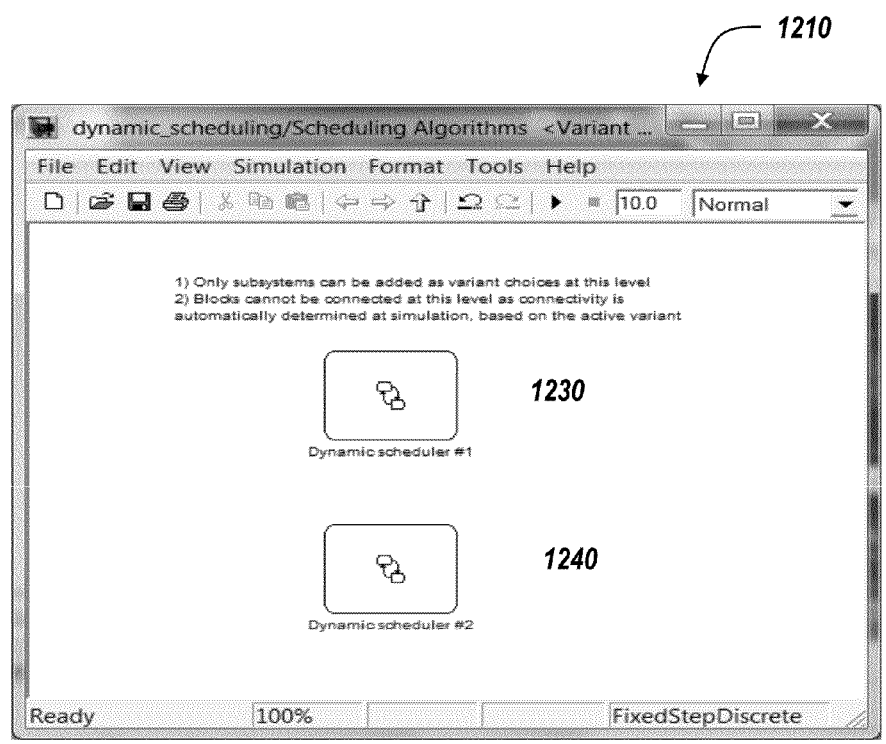
FIG. 12B depicts the two exemplary co-simulation dynamic schedulers represented by the block in the exemplary BDE model illustrated in FIG. 11A.

FIG. 12A depicts an exemplary embodiment in a BDE that an exemplary interactive dynamic scheduler that implements a dynamic scheduling scheme that meets design requirements for a BDE model. FIG. 12A depicts exemplary BDE model 1200 with four application components 1202, 1204, 1206 and 1208 and interactive dynamic scheduler 1210. BDE model 1200 may execute in co-simulation with an SMP. Application component 1202 and application component 1204 contain algorithms that run periodically while application component 1206 is triggered by application component 1204 aperiodically. Application component 1208 is triggered aperiodically by application component 1206. Dynamic schedulers can be appropriate for an application where application components execute aperiodically (i.e., are nondeterministic relative to time). In this situation, execution requirements and/or resource requirements of the application may not be constant. As a result, the requirements may vary significantly as a function of time.

Accordingly, in FIG. 12A, an interactive dynamic scheduler may be better suited for BDE model 1200 as compared to an interactive static scheduler. Profiling results can be back-annotated to model 1200 and shown on BDE representations of components 1202, 1204, 1206 and 1208. The profiling results may be displayed in streaming fashion. Interactive dynamic scheduler 1210 may switch between a plurality of co-simulation dynamic schedulers during execution of BDE model 1200. Interactive dynamic scheduler 1210 may generate one conventional dynamic scheduler using the plurality of co-simulation dynamic schedulers based on execution, i.e. simulation, results of BDE 1200. According to various embodiments, a conventional dynamic scheduler may be generated using a single co-simulation dynamic scheduler. An interactive dynamic scheduler adds the ability to consider multiple co-simulation dynamic schedulers and generate an optimal, i.e. desired, conventional dynamic scheduler. Interactive dynamic scheduler 1210 is illustrated in greater detail in FIG. 12B.

For example, interactive dynamic scheduler 1210 may switch between a first co-simulation dynamic scheduler 1230 or a second co-simulation dynamic scheduler 1240. According to various embodiments, co-simulation dynamic scheduler 1230 may implement a dynamic scheduling algorithm where application components 1202, 1204, 1206 and 1208 of BDE model 1200 are assigned to SMP cores based on shortest predicted execution time mapped to least busy core. Co-simulation dynamic scheduler 1240 may implement a dynamic scheduling algorithm based on executing the longest waiting component first on the least busy core. Co-simulation dynamic schedulers 1230 and 1240 execute during simulation and control the mapping of the components in model 1200 to the cores of the target SMP. After co-simulation, a conventional dynamic scheduler may be generated using one of the co-simulation dynamic schedulers 1230 and 1240. For example, the optimal conventional dynamic scheduler may be generated that corresponds to the co-simulation dynamic scheduler that had the best runtime statistics during execution of BDE model 1200.

Figure 12C:
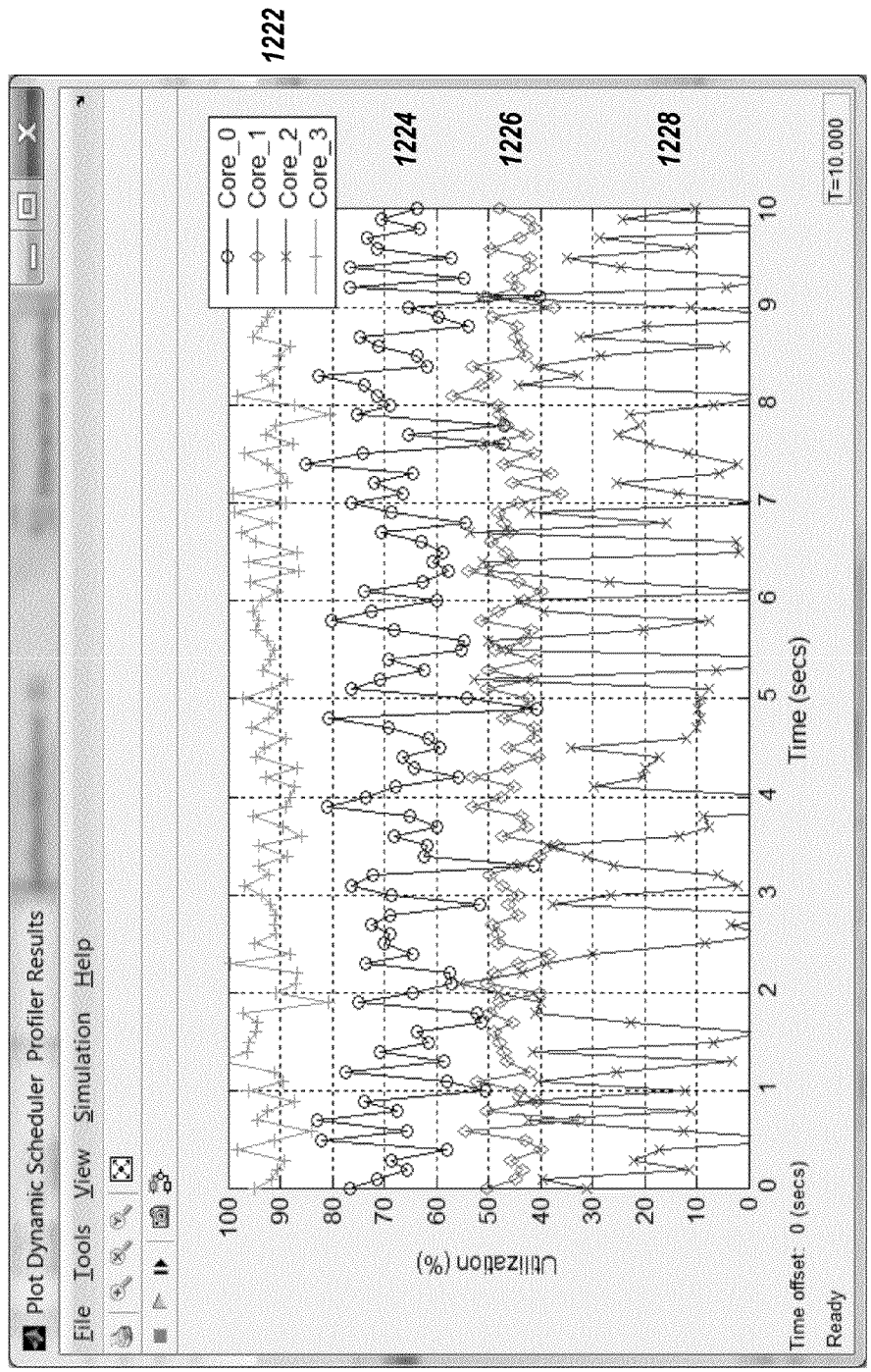
FIG. 12C depicts an exemplary plot of execution profiling results for target processor cores (during co-simulation using interactive dynamic scheduler) for the exemplary BDE model illustrated in FIG. 12A.

FIG. 12C depicts an exemplary graph of runtime statistics for each processor core of SMP during the co-simulation of model 1200 performed with interactive dynamic scheduling. FIG. 12C graphically depicts core utilization on the target SMP over time for model 1200 that is being co-simulated according to the dynamic scheduling scheme illustrated in FIG. 12A. As illustrated in FIG. 12A, application component 1202 is assigned to core 0, application component 1204 is assigned to core 2, application component 1206 is assigned to core 3 and application component 1208 is assigned to core 1. The respective utilization rates associated with cores 0, 1, 2 and 3 are 66%, 42%, 21% and 91%. Accordingly, graph 1224 for core 0 indicates an utilization rate of about 66%. Graph 1226 for core 1 indicates a utilization rate of about 42%. Graph 1228 for core 2 indicates a utilization rate of about 21% and graph 1222 for core 3 indicates an utilization rate of about 91%. The graphs 1222, 1224, 1226 and 1228 provide visual representation illustrating the utilization rates of all cores on the SMP. It should be noted that as a co-simulation dynamic scheduler dynamically maps application components to specific cores of the SMP during co-simulation, the utilization rates by core may vary wildly than that of a conventional static scheduler.

In addition to improving the execution efficiency, it may be necessary to re-map the components to different cores to satisfy system requirements and/or design constraints. An embodiment may be used to identify schedulers that satisfy certain system requirements and/or design constraints. For example, with regard to the model 1200 depicted in FIG. 12A, an adequate, or possibly optimal, interactive dynamic scheduler might have to take the following into account to satisfy design constraints:

1. Application component 1202 handles real-time events such as user inputs. In order to adequately respond to real-time events the core that application component 1202 runs on cannot be loaded by more than 80% at any time;
2. Application component 1206 is strictly used as a computational accelerator to application component 1204 (i.e., application component 1206 is triggered by application component 1204), application component 1206 must therefore execute on a different core than application component 1204;
3. The overall power the system is using needs to be minimized: core 1 is always running but core 2 and core 3 are used on demand and put to sleep the rest of the time to save power; and
4. Collective components mapped to core 1 must have a total utilization of 50% or less because another application uses up to 45% of core 1 at any given time.

The profiling results accumulated and transmitted back to the co-simulation design environment may be used to determine how well a candidate co-simulation dynamic scheduler meets these requirements. It will be appreciated that the above requirements are illustrative and that many other design requirements are also within the scope of the present invention.

Figure 13:
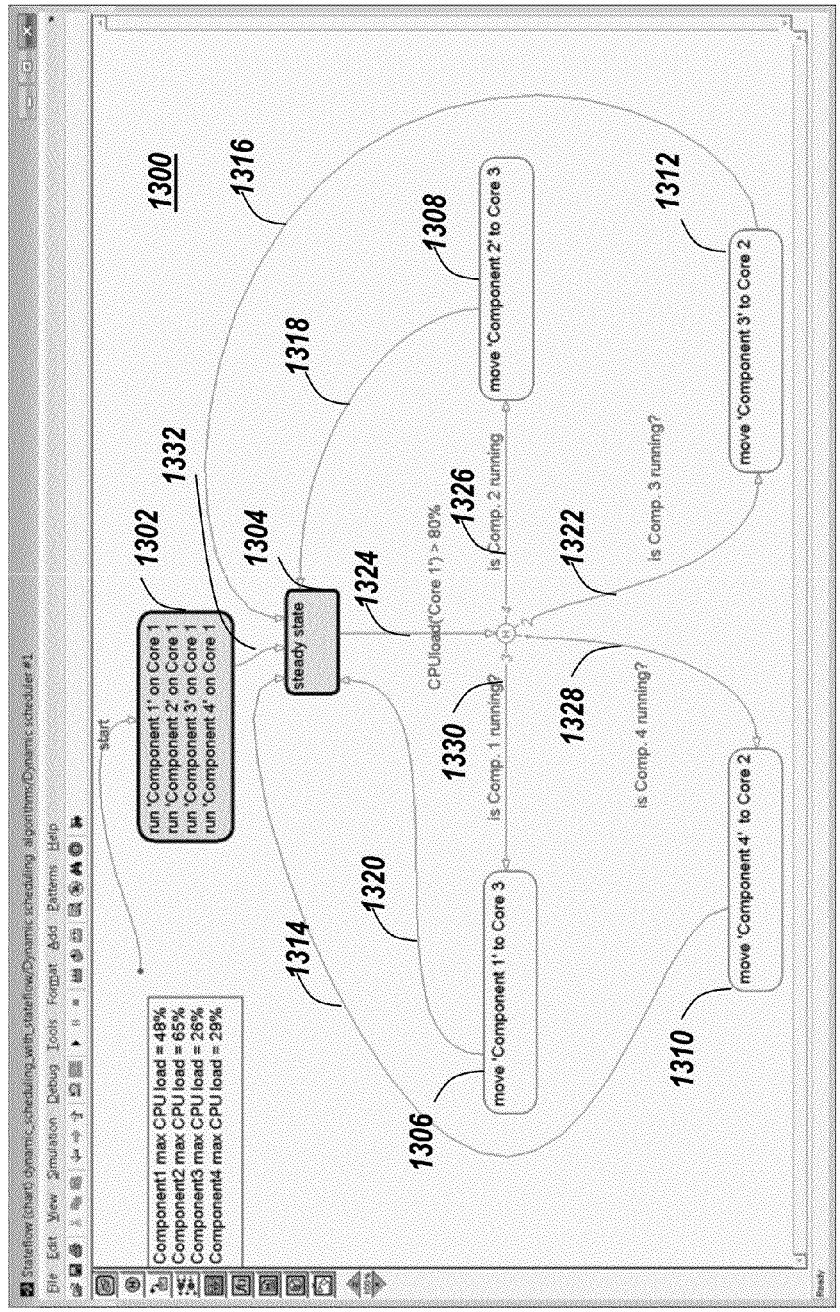
FIG. 13 depicts an exemplary co-simulation dynamic scheduler, implemented in a state chart BDE.

According to various embodiments, a co-simulation dynamic scheduler may be represented using a state chart BDE such as that depicted as chart 1300 in FIG. 13. FIG. 13 shows a co-simulation dynamic implemented as a state chart. Blocks 1302, 1304, 1306, 1308, 1310 and 1312 in state chart 1300 represent states. The directed arrows 1314, 1316, 1318, 1320, 1322, 1324, 1326, 1328, 1330, 1332 connecting one state to another are state transitions. Some state transitions, such as directed arrows 1322, 1324, 1326, 1328, 1330, have conditions attached to them signifying that state transitions occur when the specified conditions are satisfied. The co-simulation dynamic starts by transitioning to state 1302 that contains the initial conditions of the scheduling algorithm.

As illustrated in connection with state 1302, application components 1 through 4 start running on core 1. The co-simulation dynamic starts simulating in the co-simulation environment and continuously monitors the CPU load of core 1. Based on the condition associated with state transition 1324, if the CPU load of core 1 exceeds 80%, a state transition occurs. State chart 1300 tests a series of conditions to determine the next state of the algorithm. For example, the condition associated with transition 1328 tests if application component 4 is running, i.e., active. If it is determined that Component 4 is active, state transition 1328 to state 1310 occurs. As a result of state transition 1328, the co-simulation dynamic starts executing application component 4 on core 2 of the SMP, as indicated by state 1310. There is an unconditional state transition 1314 associated with state 1310, which brings the state back to 1304.

While the co-simulation dynamic is running, the co-simulation dynamic continuously receives runtime statistics from the SMP, e.g., CPU load. The co-simulation dynamic determines the mapping of application components to SMP cores based on the runtime statistics. The user may interactively vary the scheduling scheme by, for example selecting one co-simulation dynamic scheduler among a plurality of co-simulation dynamic schedulers during co-simulation, i.e. only one co-simulation dynamic scheduler is executing at any given time.

According to embodiments, the user or a program may also interactively vary the scheduling scheme by, for example, interactively varying a parameter or a condition of a state transition of a given co-simulation dynamic scheduler. Interactively varying the parameter or the condition of the state transition in turn may alter the decision making process of the co-simulation dynamic scheduler resulting in changing the behavior of the co-simulation dynamic scheduler. For example, the user may decide to change the threshold for state transition 1324 to 70% from the initial 80%. Such interactive actions do not require re-generating, re-compiling or re-running code for the application running on the SMP. Accordingly, co-simulation dynamic schedulers may be interactively modified without re-generating, re-compiling or re-running code for the application running on the SMP.

Once a satisfactory co-simulation dynamic scheduler is identified by interactive dynamic scheduling, code controlling the scheduling of the application, may be generated in the co-simulation design environment for standalone execution on the SMP. That is, a conventional dynamic scheduler is generated as a result of the by interactive static scheduling illustrated in FIG. 13.

Figure 14:
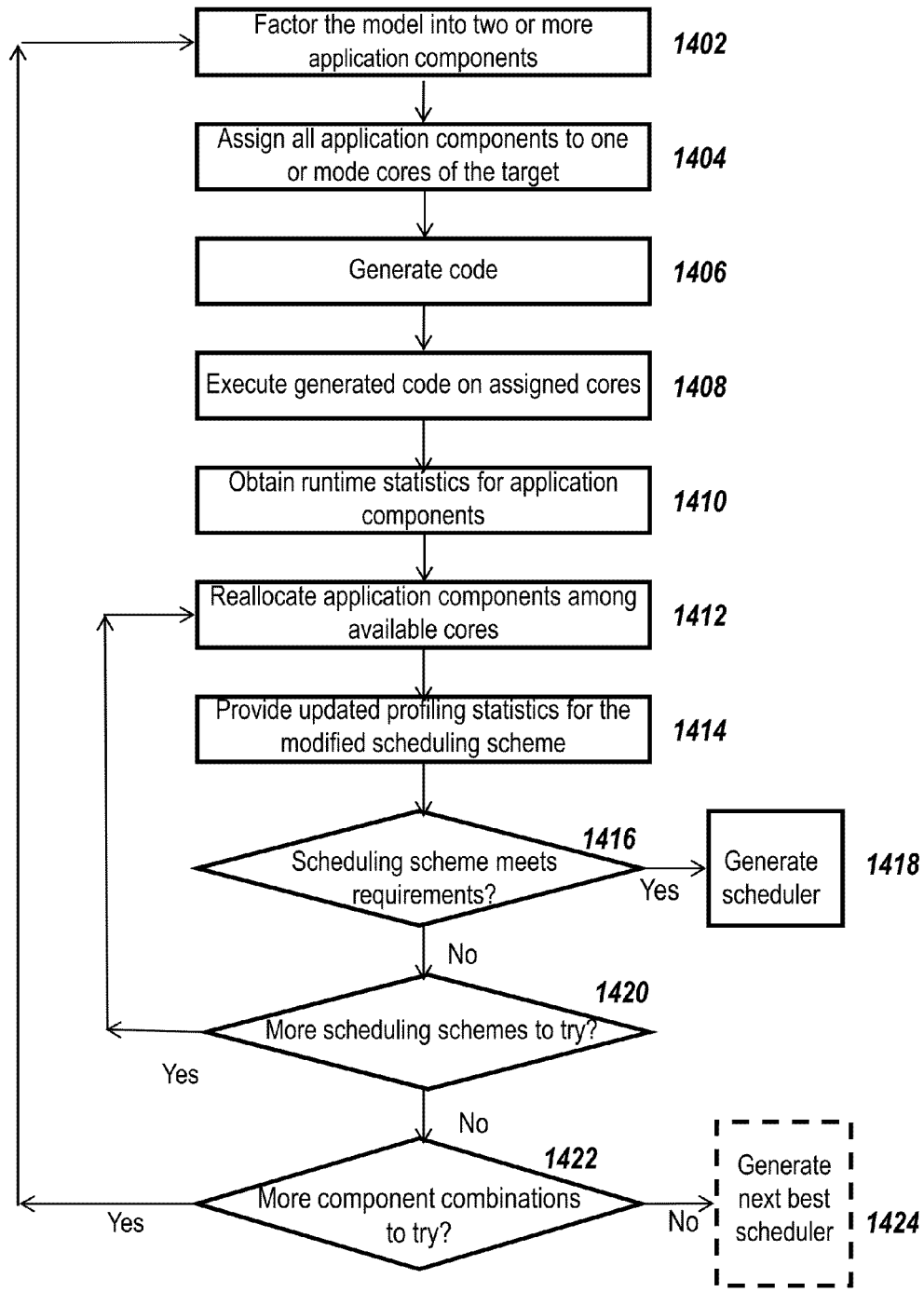
FIG. 14 is a flowchart that illustrates exemplary processing for practicing an embodiment in a BDE or TPE for determining and/or generating a conventional static or dynamic scheduler.

FIG. 14 is a flowchart illustrating exemplary processing for practicing an embodiment in a BDE or TPE so as to determine and generate a conventional static or dynamic scheduler that meets design requirements using an interactive static scheduler or an interactive dynamic scheduler, respectively.

In FIG. 14, processing may begin by factoring the design of an application, such as a model in either a BDE or TPE, into two or more application components (block 1402). As provided above, the factored application components can be defined in a BDE by block, by subsystem, by rate, by model, or by demarcated boundary. Similarly, application components in a TPE may be defined by function, by object/method, by # pragma instrumentation, by model or by demarcated boundary. For example, in an exemplary TPE (e.g., MATLAB®), code may be factored as follows:

Original:
function comm_dmt(noisePower)
x=1:0.1:1024+noisePower*randn(1024);
y=fft(x, 1024);
z=abs(fftshift(y));
avg=0.0;
for i=1:numel(z)
    avg=avg+z(i)^(2/3);
end Factor out "component 1":
function comm_dmt1(noisePower)
x=1:0.1:1024+noisePower*randn(1024);
z=component(x);
avg=0.0;
for i=1:numel(z)
    avg=avg+z(i)^(2/3);
end
% Sub-component that executes a portion of the original algorithm
function z=component(x)
y=fft(x, 1024);
z=abs(fftshift(y));

The MATLAB code above provides an example depicting how MATLAB functions can be used to factor the design into application components. The MATLAB code shows the results of factoring an application component from the original function comm_dmt, resulting in a new function comm._dmt1 with a factored application component, i.e., the function component.

Processing may initially map application components to one or more cores of the target SMP (block 1404). Code for the application may be generated based on the initial mapping (block 1406). For example, in one embodiment, default settings may initially map all application components to one core, and then generate code to be executed on that one core. Mapping all application components to execute on a single core may predict the processing time (CPU load) of each application component. However, such mapping does not predict the potential I/O wait times if dependent data were to come from a different core (i.e., wait times caused by inter-thread communications and synchronization). Also, the profiling results of the single core execution may not account for cache effects associated with multi-core parallel execution. That is, runtime statistics such as CPU load may not be an exact predictor for CPU load when the application components are distributed across multiple cores in parallel. As a result, in other embodiments, an initial mapping of application components may be distributed across multiple cores rather than all of the components being assigned to execute on the same core.

Once mapped, the application may be co-simulated by executing some application components in the co-simulation design environment and executing other application components for which code has been generated on the SMP using the assigned core(s) (block 1408).

Profiling may be performed on different components running on the SMP cores during co-simulation. Runtime statistics for the application components can be captured and stored or displayed (block 1410). The runtime statistics may be displayed in the co-simulation design environment in various graphical and textual formats during co-simulation. For example, runtime statistics may be displayed by back-annotation to the corresponding application components in the co-simulation design environment. For example, a textual display of runtime statistics may include CPU load, memory usage, cache utilization, cache hit/miss statistics, system throughput, input wait times, buffer use/re-use, thread dependencies graph/timelines, etc.

Processing allows for interactively varying the scheduling scheme by reallocating one or more application components to available cores during co-simulation (block 1412). Reallocation of the application components to available cores results in a modified mapping, i.e., modified scheduling scheme. The interactive varying of scheduling scheme occurs without a user or program first having to re-generate, re-write, re-compile, re-link, re-download and/or re-run the application code. Embodiments allow implementing application components deployed as threads of execution in a multi-threaded process to allow for varying the scheduling scheme.

A thread may be mapped to any core of an SMP based on, for example, inter-thread communication primitives. The inter-thread communication primitives may include an OS-supplied interface and synchronization abstractions like pipes, messages queues, etc., to carry signal buffers back and forth across the components. Instrumenting and parameterizing the generated code using application programming interfaces (APIs) may allow the co-simulation design environment to tune the processor core affinity while the application components are running on the SMP. Notwithstanding the above, it should be appreciated that threading is one way to dynamically map application components to cores at runtime and embodiments are not limited to deploying application components as separate threads of execution in a multi-threaded process.

Runtime statistics may be updated for the new, modified scheduling scheme. The updated runtime statistics may be analyzed programmatically and/or by a user (block 1414). For example, the runtime statistics may be sent back to the co-simulation design environment and back-annotated to the corresponding application components. A user may determine whether the modified scheduling scheme meets requirements. Alternatively, a program may determine whether the modified scheduling scheme meets requirements based on comparing the runtime statistics to pre-determined criteria. If the updated runtime statistics indicate that the modified scheduling scheme meets design requirements ("yes" for block 1416), a conventional static or dynamic scheduler implementing the modified scheduling scheme is generated for the application (block 1418). The process ends with generating the conventional static or dynamic scheduler.

If the scheduling scheme does not meet requirements ("no" for block 1416) a further decision is made as to whether or not there are additional scheduling schemes to attempt (block 1420).

If there are more scheduling schemes to try in the search for a scheduling scheme that best meets design requirements ("yes" for block 1420), the sequence repeats and allows the interactive scheduler to reallocate application components to different cores (block 1412).

If there are no more scheduling schemes to try ("no" for block 1420) a further determination may be reached as to whether or not there are any more application component combinations to try in which the various elements in the model may be factored into different combinations (block 1422). The decision as to whether or not there are more application component combinations to try may be made by a user or may be programmatically determined based on pre-determined criteria. If there are more application component combinations to try ("yes" for block 1422), the process iterates and the application design is factored into two or more different application components (block 1402). If there are no more application component combinations to try ("no" for block 1422), then processing may optionally generate the next best conventional static or dynamic scheduler (block 1424). According to various embodiments, the processing may end without generating a conventional static or dynamic scheduler.

The processing described above in reference to FIG. 14 illustrates an exemplary sequence in which a scheduler that is good enough to meet a design requirement is produced. Processing depicted in FIG. 14 stops once any conventional static or dynamic scheduler that meets design requirements is found. In another exemplary embodiment, the processing of FIG. 14 can be adjusted so as to attempt to generate an optimal conventional static or dynamic scheduler. The processing can include determining whether the current conventional static or dynamic scheduler is the best so far in the co-simulation. The determination may be by a user or programmatically determined without user input based on pre-determined criteria. For example, design requirements for the application may be automatically compared to the profiling results of the modified scheduling scheme to see if the profiling result passes a pre-determined threshold. One or more modified scheduling schemes may be compared and the best scheme may be determined for example as the best-so-far scheduling scheme. The resulting scheduler may be the best-so-far conventional static or dynamic scheduler implementing the best-so-far scheduling scheme.

The potential re-factoring of the application design by assembling new application component combinations provides greater flexibility in identifying an optimal conventional static or dynamic scheduler that meets application design requirements than does the varying of mappings alone. Thus, using the exemplary techniques described above, a generated conventional static or dynamic scheduler that meets design requirements can continually be refined and improved in an attempt to identify an optimal conventional static or dynamic scheduler for an application under development in the co-simulation design environment.

If the co-simulation techniques described above are unable to identify a satisfactory conventional static or dynamic scheduler, a user may need to change some of the variables affecting the co-simulation of the application design. For example, the user (or program) may choose a different SMP platform (with different characteristics), reduce complexity of the application design, lower scheduling requirements, or make other changes and then perform the above-described techniques again to attempt to identify a satisfactory conventional static or dynamic scheduler.

Figure 15:
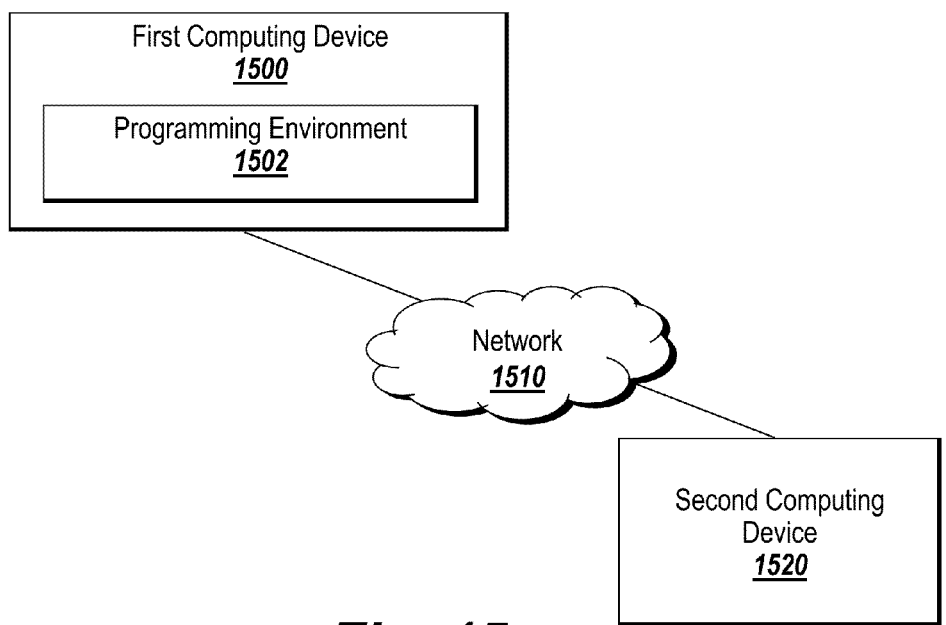
FIG. 15 depicts an exemplary distributed system suitable for practicing an exemplary embodiment.

FIG. 15 depicts an exemplary distributed system suitable for practicing a distributed embodiment. In, FIG. 15 an exemplary network environment may include one or more computing devices 1500 and 1520 communicating via a network 1510. Network 1510 may be the Internet, intranet, LAN (Local Area Network), WAN (Wide Area Network), MAN (Metropolitan Area Network), wireless network (e.g., using IEEE 802.13 and Bluetooth), etc. In addition network 1510 may use middleware, such as CORBA (Common Object Request Broker Architecture) or DCOM (Distributed Component Object Model) to allow a computer on the network to communicate directly with another computer or device that is connected to the network. The communication facilities can support the distributed implementations of the present invention and may utilize Remote Method Invocation (RMI), Remote Procedure Calls (RCP), Simple Object Access Protocol (SOAP), etc.

In the network environment, computing devices 1500 and 1520 may provide clients with software components or products under a particular condition, such as a license agreement. The software components or products may include those for providing co-simulation design environment 110 and/or implementations of code for select elements. In one example, computing device 1500 may perform program development in the co-simulation design environment 110 while computing device 1520 hosts a target hardware used in the co-simulation.

In an embodiment a non-transitory computer-readable media is provided. The media comprises one or more instructions that, when executed, cause at least one computing device to interact with a co-simulation design environment using an interface to communicate with a multi-threaded application executing on a target processor. The target processor includes a plurality of symmetric processor cores. The media further comprises one or more instructions that, when executed, cause at least one computing device to allocate execution of the multi-threaded application to one or more symmetric processor cores of the target processor using the interface. The media also comprises one or more instructions that, when executed, cause at least one computing device to receive an interactive instruction via the co-simulation design environment, the interactive instruction to alter allocation of at least a portion of the execution of the multi-threaded application. The media further comprises one or more instructions that, when executed, cause at least one computing device to alter, via the interface, allocation of the at least a portion of the execution of the multi-threaded application.

In another embodiment a method for interactively varying scheduling of a multi-threaded application executing on a symmetric multi-core processor is provided. The method interacts with a co-simulation design environment using an interface to communicate with a multi-threaded application executing on a target processor. The target processor includes a plurality of symmetric processor cores. The method further allocates execution of the multi-threaded application to one or more symmetric processor cores of the target processor using the interface. The method receives an interactive instruction via the co-simulation design environment. The interactive instruction is to alter allocation of at least a portion of the execution of the multi-threaded application. The method alters, via the interface, allocation of the at least a portion of the execution of the multi-threaded application.

In an embodiment, a system for interactively varying scheduling of a multi-threaded application executing on a symmetric multi-core processor is provided. The system includes a memory and a processor. The memory stores allocation information. The processor interacts with the memory and uses the allocation information to interact with an interface in a co-simulation design environment to communicate with a multi-threaded application executing on a target processor. The target processor includes a plurality of symmetric processor cores. The processor further uses the allocation information to allocate execution of the multi-threaded application to one or more symmetric processor cores of the target processor using the interface. The allocating occurs when the multi-threaded application is executing, without re-generating, re-compiling or re-running code for the multi-threaded application. The processor further uses the allocation information to receive an interactive instruction via the co-simulation design environment. The interactive instruction is to alter allocation of at least a portion of the execution of the multi-threaded application while the multi-threaded application is executing. The processor further uses the allocation information to receive execution data from the multi-threaded application executing on the one or more symmetric processor cores of the target processor. The receiving occurs in the co-simulation design environment via the interface, and when the multi-threaded application is executing. The processor further uses the allocation information to alter, via the interface, allocation of the at least a portion of the execution of the multi-threaded application based on the received data, while the multi-threaded application is executing on the symmetric processor cores of the target processor, without re-generating, re-compiling or re-running code for the multi-threaded application.

Although the embodiments described above take place within a co-simulation design environment, other embodiments are also possible within the scope of the present invention. For example, in another embodiment, the search to identify static and dynamic schedulers as described above may take place completely within a simulation environment. In such an embodiment, instead of generating code for a target hardware that will be executed on an actual SMP during co-simulation, the performance of the SMP cores in executing the application being designed may be completely simulated within a simulation design environment. During the simulation, a user or program may be presented with simulated performance data representing the performance of the virtual cores of the SMP and may adjust scheduling attributes based on the data. While such an embodiment may suffer some accuracy loss due to not running the application code on the actual target hardware, it may provide a lower cost alternative and be more readily-available than the co-simulation techniques described above as the target hardware does not need to be available during application design.

One type of application that can be co-simulated may include a block diagram model representing a real-world system. It should be noted that the term block diagram may also refer to and can include other graphical modeling formalisms. For instance, flow-charts are block diagrams of entities that are connected by relations. Flow-charts may be used to capture process flow and may not generally be suitable for describing dynamic system behavior. Data flow block diagrams are diagrams of entities with relations between them that describe a graphical programming paradigm where the availability of data is used to initiate execution of blocks in the diagram. In data flow diagrams, a block may represent an operation and a line may represent execution dependency describing the direction of data flowing between blocks. It will be appreciated that a block diagram model provided in one modeling formalism may include entities from other modeling formalisms.

Embodiments described herein may be provided as one or more computer-readable programs embodied on or in one or more physical and non-transitory computer-readable storage media. The media may be a floppy disk, a hard disk, a compact disc, a digital versatile disc, a flash memory card, a PROM, an MRAM, a RAM, a ROM, a magnetic tape, etc. In general, the computer-readable programs may be implemented in any programming language. Some examples of languages that can be used include MATLAB® programming language, FORTRAN, C, C++, C#, Python, FLASH, JavaScript, or JAVA®. A programming language may be an array-based language. An array-based language is a language where an array is a basic unit of data storage. An array may have zero or more dimensions. An example of an array based language may be a language at least a subset of which is executable in the MATLAB® programming environment. The software programs may be stored on, or in, one or more mediums as object code. Hardware acceleration may be used and all or a portion of the code may run on a FPGA, an Application Specific Integrated Processor (ASIP), or an Application Specific Integrated Circuit (ASIC). The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described herein, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations described herein depending on specific deployments and/or applications. Further, disclosed implementations may not be limited to any specific combination of hardware.

Further, certain portions of the invention may be implemented as logic that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

We claim:

1. One or more non-transitory computer-readable media comprising:

one or more instructions that, when executed, cause at least one computing device to:
interact with a co-simulation design environment, the co-simulation design environment for co-simulating a model such that a first component of the model is executed on a host device as part of the co-simulating and a second component of the model is executed on a target processor having a plurality of processor cores as part of the co-simulating;
use an interface to communicate with the target processor;
allocate execution of the second component to two or more of the plurality of processor cores of the target processor using the interface;
receive an interactive instruction from the co-simulation design environment on the host device, the interactive instruction to alter allocation of at least a portion of the execution of the second component;
receive execution data regarding the second component executing on the two or more of the plurality of processor cores of the target processor, the receiving occurring in the co-simulation design environment via the interface; and
alter, via the interface, allocation of the at least a portion of the execution of the second component based on the received execution data on the two or more of the plurality of processor cores, the allocating and altering occurring without re-generating, re-compiling or re-running code for the model.

2. The medium of claim 1, wherein the allocating and altering occur when the second component is executing on the plurality of processor cores of the target processor.

3. The one or more non-transitory computer-readable media of claim 1, wherein the altering is performed based on one or more of an input received from a person, a program and an algorithm.

4. The medium of claim 1, further comprising:
one or more instructions that, when executed, cause the at least one computing device to:
receive execution data regarding the second component executing on the one or more of the plurality processor cores of the target processor, the receiving occurring:
in the co-simulation design environment via the interface, and
when the second component is executing.

5. The one or more non-transitory computer-readable media of claim 1, wherein the altering is based on the received execution data.

6. The one or more non-transitory computer-readable media of claim 1, further comprising:
one or more instructions that, when executed, cause the at least one computing device to:
display the received data in the co-simulation design environment during the executing of the second component on the target processor; and
receive subsequent data in the co-simulation design environment during the executing, the subsequent data associated with the executing of the second component following the altering allocation of the at least a portion of the execution of the second component.

7. The one or more non-transitory computer-readable media of claim 1, wherein the received data associated with the executing of the second component includes statistical data relating to the executing of the second component on the target processor.

8. The one or more non-transitory computer-readable media of claim 7, wherein the statistical data includes data relating to at least one of:
a buffer allocation, algorithm data synchronization information, or an inter-thread wait time and CPU utilization by the plurality of processor cores.

9. The one or more non-transitory computer-readable media of claim 1, further comprising:
one or more instructions that, when executed, cause the at least one computing device to:
log the received data.

10. The one or more non-transitory computer-readable media of claim 1, further comprising:
one or more instructions that, when executed, cause the at least one computing device to:
generate a fixed mapping between the execution of the second component and the plurality of processor cores of the target processor.

11. The one or more non-transitory computer-readable media of claim 10, wherein the fixed mapping is an optimal fixed mapping.

12. The one or more non-transitory computer-readable media of claim 1, further comprising:
one or more instructions that, when executed, cause the at least one computing device to:
generate a conventional dynamic scheduler.

13. The one or more non-transitory computer-readable media of claim 12, wherein the conventional dynamic scheduler implements a rule set, the rule set used in allocating the execution of the second component to the plurality of processor cores of the target processor.

14. The one or more non-transitory computer-readable media of claim 1, wherein the allocating is based on a plurality of rule sets, the plurality of rule sets being organized in a hierarchy.

15. The one or more non-transitory computer-readable media of claim 14, comprising:
one or more instructions that, when executed, cause the at least one computing device to:
generate an optimal conventional dynamic scheduler.

16. The one or more non-transitory computer-readable media of claim 15, wherein:
the plurality of rule sets includes an optimal rule set, and
the optimal conventional dynamic scheduler implements the optimal rule set.

17. The one or more non-transitory computer-readable media of claim 1, wherein the allocation identifies processor core affinity.

18. The one or more non-transitory computer-readable media of claim 1, wherein the allocation identifies thread priority.

19. The one or more non-transitory computer-readable media of claim 1, wherein the allocation maintains data synchronization within the model.

20. The one or more non-transitory computer-readable media of claim 1, wherein the model is a graphical model that includes a plurality of blocks and subsystems, the one or more non-transitory computer-readable media comprising:
one or more instructions that, when executed, cause the at least one computing device to:
allocate execution of respective ones of the plurality of blocks and subsystems to separate cores in the plurality of processor cores.

21. A method for interactively varying scheduling of a multi-threaded application, the method comprising:
interacting with a co-simulation design environment, the co-simulation design environment for co-simulating a model such that a first component of the model is executed on a host device as part of the co-simulating and a second component of the model is executed on a target processor having a plurality of processor cores as part of the co-simulating;
using an interface to communicate with the target processor;
allocating execution of the second component to two or more of the plurality of processor cores of the target processor using the interface;
receiving an interactive instruction from the co-simulation design environment on the host device, the interactive instruction to alter allocation of at least a portion of the execution of the second component;
receiving execution data regarding the second component executing on the one or more of the plurality of processor cores of the target processor, the receiving occurring in the co-simulation design environment via the interface; and
altering, via the interface, allocation of the at least a portion of the execution of the second component based on the received execution data on the two or more of the plurality of processor cores, the allocating and altering occurring without re-generating, re-compiling or re-running code for the model.

22. The method of claim 21, wherein the allocating and altering occur when the second component is executing on the plurality of processor cores of the target processor.

23. The method of claim 21, wherein the altering is performed based on one or more of an input received from a person, a program or an algorithm.

24. The method of claim 21, further comprising:
receiving execution data regarding the second component executing on the one or more of the plurality processor cores of the target processor, the receiving occurring:
in the co-simulation design environment via the interface, and
when the second component is executing.

25. The method of claim 21, wherein the altering is based on the received execution data.

26. The method of claim 21, further comprising:
displaying the received data in the co-simulation design environment during the executing of the second component on the target processor; and
receiving subsequent data in the co-simulation design environment during the executing, the subsequent data associated with the executing of the second component following the altering allocation of the at least a portion of the execution of the second component.

27. The method of claim 21, wherein the received data associated with the executing of the second component includes statistical data relating to the executing of the second component on the target processor.

28. The method of claim 27, wherein the statistical data includes data relating to at least one of:
a buffer allocation, algorithm data synchronization information, or an inter-thread wait time and CPU utilization by the plurality of processor cores.

29. The method of claim 21, further comprising:
logging the received data.

30. The method of claim 21, further comprising:
generating a fixed mapping between the execution of the second component and the one or more of the plurality of processor cores of the target processor.

31. The method of claim 30, wherein the fixed mapping is an optimal fixed mapping.

32. The method of claim 21, further comprising:
generating a conventional dynamic scheduler.

33. The method of claim 32, wherein the conventional dynamic scheduler implements a rule set, the rule set used in allocating the execution of the second component to the plurality of processor cores of the target processor.

34. The method of claim 21, wherein the allocating is based on a plurality of rule sets, the plurality of rule sets being organized in a hierarchy.

35. The method of claim 34, further comprising:
generating an optimal conventional dynamic scheduler.

36. The method of claim 35, wherein:
the plurality of rule sets includes an optimal rule set, and
the optimal conventional dynamic scheduler implements the optimal rule set.

37. The method of claim 21, wherein the allocation identifies processor core affinity.

38. The method of claim 21, wherein the allocation identifies thread priority.

39. The method of claim 21, wherein the allocation maintains data synchronization within the model.

40. The method of claim 21, wherein:
the model is a graphical model that includes a plurality of blocks and subsystems, and
wherein the method further comprises allocating execution of respective ones of the plurality of blocks and subsystems to separate cores in the plurality of processor cores.

41. A system for interactively varying scheduling of a multi-threaded application, comprising:
a memory storing allocation information; and
a processor interacting with the memory and using the allocation information to:
interact with an interface in a co-simulation design environment, the co-simulation design environment for co-simulating a model such that a first component of the model is executed on a host device as part of the co-simulating and a second component of the model is executed on a target processor having a plurality of processor cores as part of the co-simulating;
communicate with the target processor;
allocate execution of the second component to one or more of the plurality of processor cores of the target processor using the interface, the allocating occurring without re-generating, re-compiling or re-running code for the graphical model;
receive an interactive instruction from the co-simulation design environment on the host device, the interactive instruction to alter allocation of at least a portion of the execution of the second component;
receive execution data regarding the second component executing on the plurality of processor cores of the target processor, the receiving occurring in the co-simulation design environment via the interface; and
alter, via the interface, allocation of the at least a portion of the execution of the second component based on the received data, the allocating and altering occurring without re-generating, re-compiling or re-running code for the model.

42. The system of claim 41, the processor further using the allocation information to:
generate a fixed mapping between the execution of the second component and the plurality of processor cores of the target processor.

43. The system of claim 41, wherein the fixed mapping is an optimal fixed mapping.

44. The system of claim 42, the processor further using the allocation information to:
generate a conventional dynamic scheduler.

45. The system of claim 44, wherein the conventional dynamic scheduler implements a rule set, the rule set used in allocating the execution of the second component to the plurality of processor cores of the target processor.

46. The system of claim 41, wherein the allocating is based on a plurality of rule set, the plurality of rule set being organized in a hierarchy.

47. The system of claim 46, the processor further using the allocation information to:
generate an optimal conventional dynamic scheduler.

48. The system of claim 47, wherein:
the plurality of rule set includes an optimal rule set, and
the optimal conventional dynamic scheduler implements the optimal rule set.

\* \* \* \* \*

UNITED STATES PATENT AND TRADEMARK OFFICE
CERTIFICATE OF CORRECTION

PATENT NO. : 9,317,331 B1
APPLICATION NO. : 13/665635
DATED : April 19, 2016
INVENTOR(S) : David Koh et al.

Page 1 of 1

It is certified that error appears in the above-identified patent and that said Letters Patent is hereby corrected as shown below:

In the Claims

Column 34, line 65, in claim 44, delete "claim 42" and insert --claim 41-- in lieu thereof.

Signed and Sealed this
Twelfth Day of July, 2016

Michelle K. Lee
*Director of the United States Patent and Trademark Office*